(12) United States Patent
Tadakuma et al.

(10) Patent No.: US 12,233,540 B2
(45) Date of Patent: Feb. 25, 2025

(54) DIFFERENTIAL MECHANISM

(71) Applicant: YAMAGATA UNIVERSITY, Yamagata (JP)

(72) Inventors: Riichiro Tadakuma, Yamagata (JP); Kazuki Abe, Yamagata (JP)

(73) Assignee: YAMAGATA UNIVERSITY, Yamagata (JP)

( * ) Notice: Subject to any disclaimer, the term of this patent is extended or adjusted under 35 U.S.C. 154(b) by 195 days.

(21) Appl. No.: 17/764,978

(22) PCT Filed: Dec. 7, 2021

(86) PCT No.: PCT/JP2021/045012
§ 371 (c)(1),
(2) Date: Mar. 30, 2022

(87) PCT Pub. No.: WO2022/168432
PCT Pub. Date: Aug. 11, 2022

(65) Prior Publication Data
US 2023/0193986 A1    Jun. 22, 2023

(30) Foreign Application Priority Data

Feb. 2, 2021 (JP) .................................. 2021-015334

(51) Int. Cl.
*B25J 17/02*    (2006.01)
*B25J 9/12*    (2006.01)
(Continued)

(52) U.S. Cl.
CPC ........... *B25J 17/0283* (2013.01); *B25J 9/126* (2013.01); *F16H 1/04* (2013.01); *F16H 1/203* (2013.01);
(Continued)

(58) Field of Classification Search
CPC .......... F16H 1/04; F16H 1/203; F16H 37/065; F16H 37/0826; F16H 55/02; F16H 55/0846; B25J 9/126; B25J 17/0283
See application file for complete search history.

(56) References Cited

U.S. PATENT DOCUMENTS 2,609,703 A * 9/1952 Hesch, Sr. ............ F16H 48/295
                                                          74/424.5
5,533,418 A * 7/1996 Wu .......................... B25J 9/102
                                                            901/29
(Continued)

FOREIGN PATENT DOCUMENTS

CN     110273979 A  *  9/2019  ............... F16H 1/24
JP     H888987 A        4/1996
(Continued)

OTHER PUBLICATIONS

Kazuki Abe et al., "ABENICS: Active Ball Joint Mechanism With Three-DoF Based on Spherical Gear Meshings", IEEE Transactions on Robotics, Apr. 26, 2021, pp. 1-20, 20p.
(Continued)

*Primary Examiner* — Joseph Brown
(74) *Attorney, Agent, or Firm* — HAUPTMAN HAM, LLP

(57) ABSTRACT

A differential mechanism includes: a rotating frame rotatably provided in a main body frame; an inner worm gear formed in a cylindrical shape, covering the outer periphery of the rotating frame, and rotatably provided coaxially with the rotating frame, and having a spiral tooth formed on the cylindrical inner side; and a worm wheel rotatably provided on the rotating frame in a direction orthogonal to an axis of the rotating frame and meshing with the inner worm gear.

8 Claims, 18 Drawing Sheets

(51) Int. Cl.
*F16H 1/04* (2006.01)
*F16H 1/20* (2006.01)
*F16H 19/08* (2006.01)
*F16H 37/06* (2006.01)
*F16H 55/02* (2006.01)

(52) U.S. Cl.
CPC ........... *F16H 19/08* (2013.01); *F16H 37/065* (2013.01); *F16H 55/02* (2013.01)

(56) References Cited

U.S. PATENT DOCUMENTS

| | | | | |
|---|---|---|---|---|
| 6,353,773 | B1* | 3/2002 | Takenaka | ................. B25J 13/04 340/5.1 |
| 2012/0067166 | A1* | 3/2012 | Gewirtz | ................ F16H 37/065 74/665 C |
| 2012/0103126 | A1* | 5/2012 | Li | ........................ B25J 17/0241 74/490.05 |
| 2015/0128734 | A1* | 5/2015 | Hong | .................. F16H 55/0813 74/98 |
| 2018/0284578 | A1 | 10/2018 | Matsuda et al. | |
| 2019/0283242 | A1* | 9/2019 | Okazaki | ................ F16H 19/043 |

FOREIGN PATENT DOCUMENTS

| | | | |
|---|---|---|---|
| JP | 2017067165 | A | 4/2017 |
| JP | 2018172015 | A | 11/2018 |
| JP | 201990495 | A | 6/2019 |
| JP | 7129047 | B2 | 9/2022 |
| WO | WO-2006018665 A1 * | 2/2006 | ............... F16H 1/24 |
| WO | WO-2021005558 A1 * | 1/2021 | |

OTHER PUBLICATIONS

Kazuki Abe et al., "Development of Control Method for Active Ball Joint Mechanism Considering Singularity of Spherical Gear", 2021 IEEE/SOCE International Symposium on System Integrations, Jan. 11-14, 2021, Japan, pp. 690-695, 6p.

\* cited by examiner

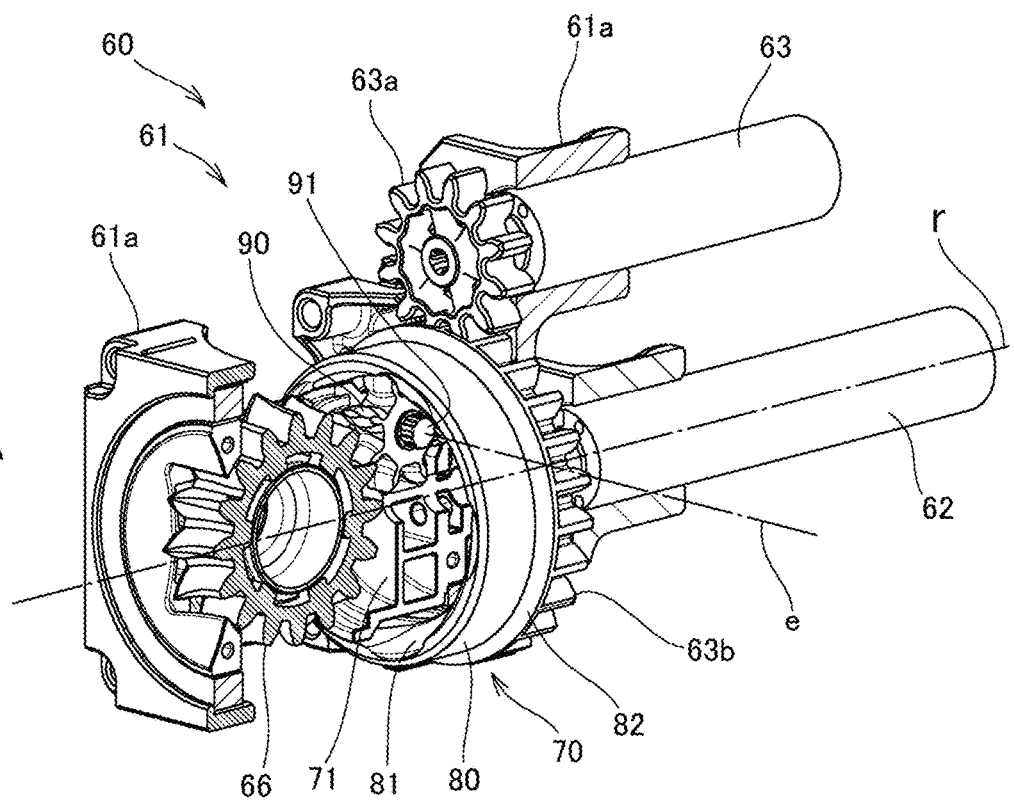
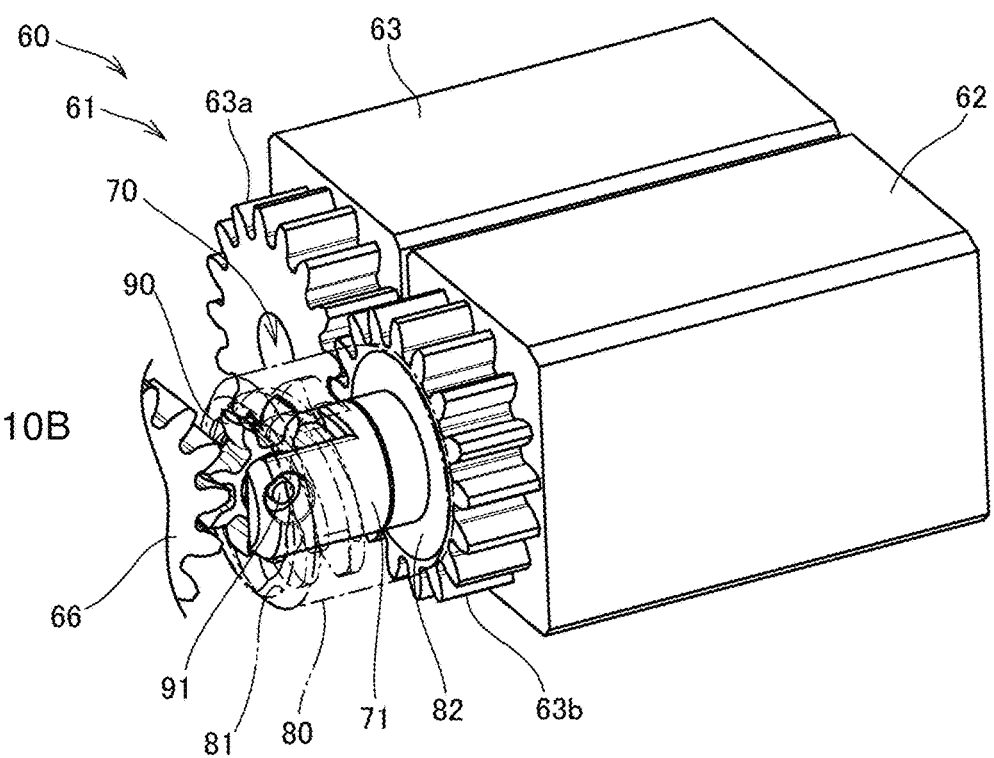

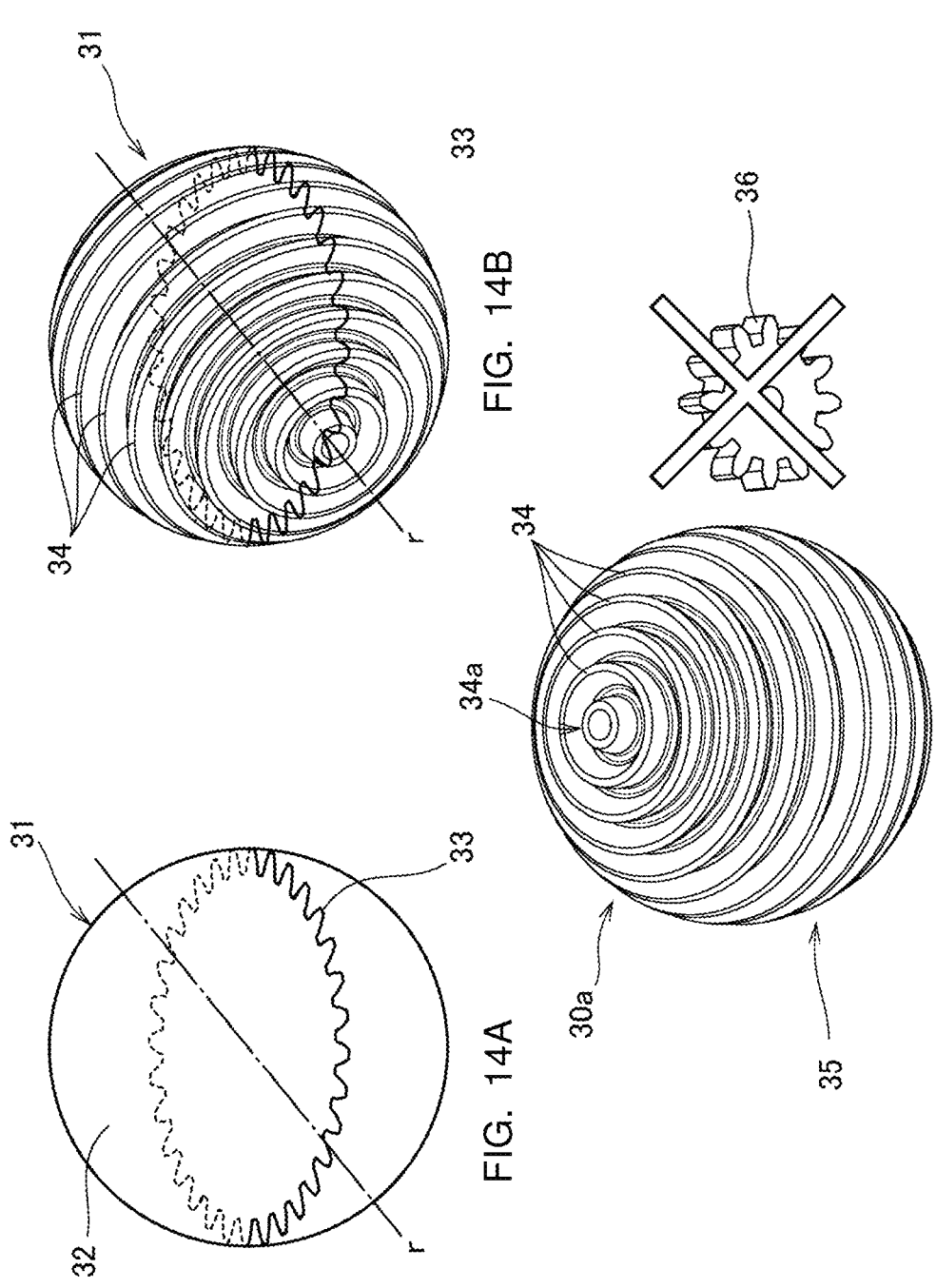

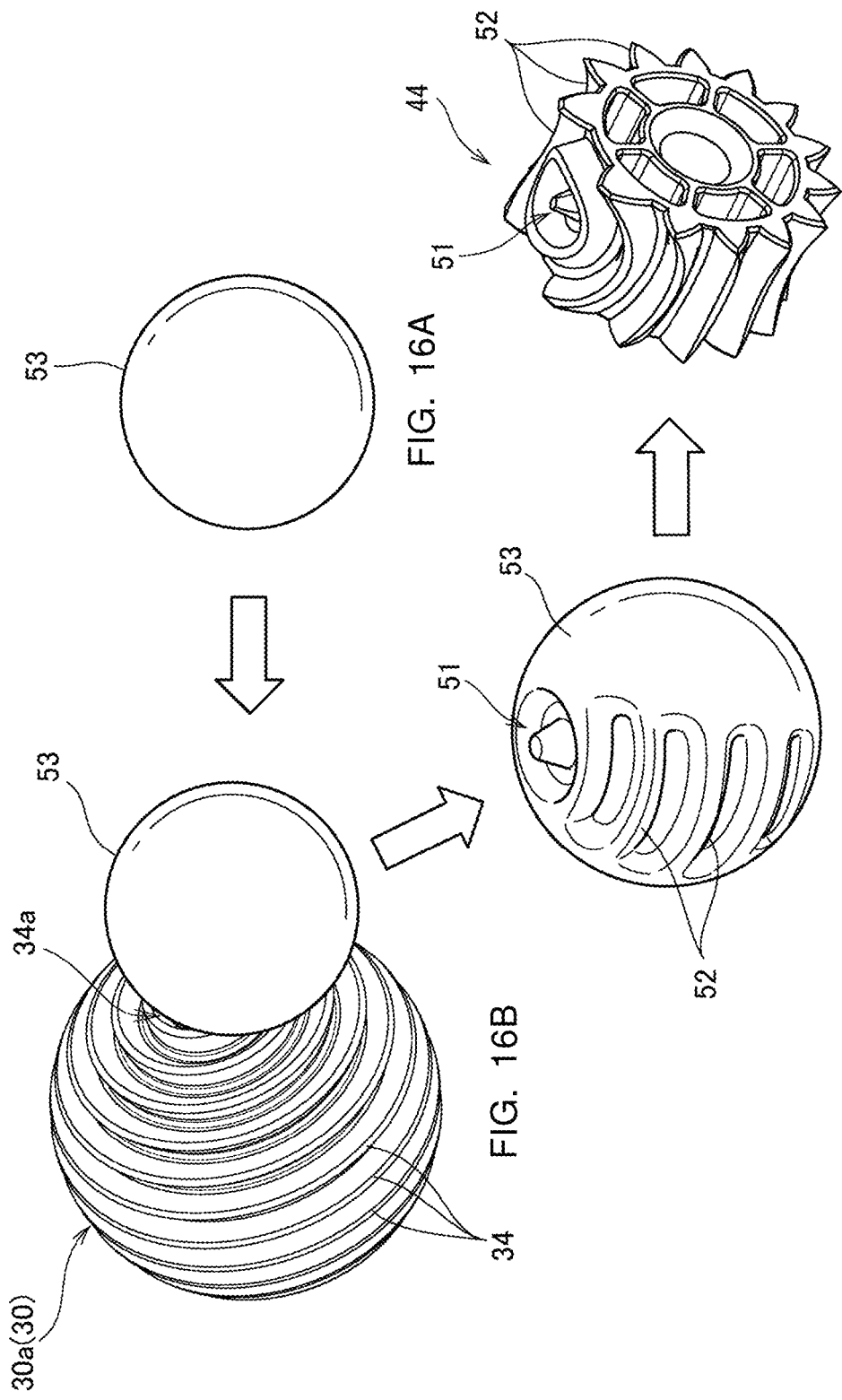

DIFFERENTIAL MECHANISM

RELATED APPLICATIONS

The present application is a National Phase of International Application No. PCT/JP2021/045012 filed Dec. 7, 2021, which claims priority to Japanese Application No. 2021-015334, filed Feb. 2, 2021.

FIELD

The present invention relates to a differential mechanism having two degrees of freedom, comprising a worm gear and a worm wheel.

BACKGROUND

In recent years, automation with respect to robots has been promoted, and there has been a need to adjust the position and orientation of a camera, a robot arm, or the like in a plurality of degrees of freedom.

In general, a robot arm or the like, which is a representative of a multi-joint robot, is a structure in which a motor on the base side bears a load, a load due to inertia, or the like, of the motor itself on the hand side, and is not an economical structure. In that respect, a differential mechanism capable of outputting multiple degrees of freedom while fixing all the motors is promising as an alternative. As a drive unit having such a differential mechanism that provides two degrees of freedom while fixing all of the motors, a technique disclosed in PTL 1 and PTL 2 is known.

The drive unit of PTL 1 uses a differential mechanism composed of a rotatable rotation case, a central worm gear provided in the rotation case, and a worm wheel revolving around the worm gear, and outputs a spherical gear provided at a tip end in two degrees of freedom. However, in this configuration, since the worm gear is disposed at the center, the power transmission element must be disposed so as to bypass the worm gear, and the error increases due to the increase in the transmission element, and the outer shape (diameter) required by the differential mechanism is at least the cylindrical diameter of the worm gear+the cylindrical diameter×2 of the worm wheel, making the inertia large and difficult to miniaturize. Further, if the worm gear is forcibly reduced in order to downsize, the rigidity of the tooth is lowered, and the transmission force must be suppressed small.

In addition, in the drive unit of PTL 2, the first rotating body and the second rotating body form a circular ring shape having an outer surface in which the left and right of the spherical surface are symmetrically cut off, and are inserted inside each other and connected in a chain shape. The rotation transmitting portion has a helical gear disposed inside the first rotating body and the second rotating body so as to be in contact with the inner surface of the first rotating body located inside the second rotating body and the inner surface of the second rotating body located inside the first rotating body, respectively, and rotatably provided about a predetermined axis. The first rotating body and the second rotating body each have a helical internal gear provided on the inner surface along the circumferential direction so as to mesh with the helical gear of the rotation transmission portion. However, the inner rotation transmitting portion and the second rotating body revolve together around the predetermined axis in synchronization with each other, and are not used as a differential mechanism.

CITATION LIST

Patent Literature

[PTL 1] Japanese Unexamined Patent Publication No. 2019-90495
[PTL 2] Japanese Unexamined Patent Publication No. 2018-172015

SUMMARY

Technical Problem

In view of the foregoing, it is an object of the present invention to provide a differential mechanism having two degrees of freedom, which is compact and capable of reducing differential errors.

Solution to Problem

According to the present invention, there are provided a rotating frame rotatably provided in a main body frame, an inner worm gear formed in a cylindrical shape, covering an outer periphery of the rotating frame and rotatably provided coaxially with the rotating frame, and having a spiral tooth formed on the cylindrical inner side, and a worm wheel rotatably provided on the rotating frame in a direction orthogonal to an axis of the rotating frame and meshing with the inner worm gear, wherein the worm wheel performs two rotation outputs of roll axis rotation and pitch axis rotation coaxial with the rotating frame with respect to two rotation inputs of the rotating frame and the inner worm gear.

According to such a configuration, the differential mechanism comprises the inner worm gear formed in the cylindrical shape, covering the outer periphery of the rotating frame and rotatably provided coaxially with the rotating frame, and having the spiral tooth formed in the cylindrical inner side, and the worm wheel provided on the rotating frame so as to be rotatable around the axis orthogonal to the axis of the rotating frame at a twist position, and to mesh with the inner worm gear. Since the inner worm gear has helical teeth formed on the inner side of the cylindrical portion, and the worm wheel is disposed on the inner side of the inner worm gear, the differential mechanism can be miniaturized.

If the sizes of the teeth of the worm gear and the worm wheel of PTL 1 and the sizes of the teeth of the inner worm gear and the worm wheel of the present case are made equal, the outer diameter of the rotating case in PTL 1 will be larger, because a separate worm gear is placed in the center of the inside of the rotating case and the worm wheel that meshed with the worm gear is also placed, so the outer shape (diameter) required for the differential mechanism is at least the cylindrical diameter of the worm gear+the cylindrical diameter×2 of the worm wheel. In this respect, the differential mechanism of the present invention can be miniaturized even compared with PTL 1, because, in the inner worm gear of the present invention, the tooth is formed in a spiral shape directly on the inside of the cylindrical portion forming the outer shape, and only the worm wheel can be disposed on the inner side thereof.

Further, in the present invention, since the tooth is formed in a spiral shape directly inside the cylindrical portion forming the outer shape of the inner worm gear, it is possible to reduce the number of transmission elements (the number of parts) to reduce the differential error. Thus, in the present invention, it is possible to provide a differential mechanism having two degrees of freedom, which is compact and can reduce differential errors.

Preferably, the worm wheel is a spur gear whose tooth surface has a cylindrical tooth surface or a spherical crowning tooth surface.

According to this configuration, since the tooth surface of the pinion (tooth) of the worm wheel is the cylindrical tooth surface or the spherical crowning tooth surface, it can smoothly mesh with the tooth surface of the inner worm gear inclined with respect to the axis of the worm wheel on the pitch circle, and can smoothly mesh with the tooth surface of the spur gear of the transmission destination. Therefore, not only the affinity with the conventional transfer element is high, but also the back drivability can be expressed.

Preferably, the worm wheel is a helical gear.

According to this configuration, the worm wheel is a helical gear, and since the tooth bars are twisted, the worm wheel smoothly meshes with the tooth bars of the inner worm gear inclined with respect to the axis of the worm wheel on the pitch circle. In this case, when the transmission destination gear is also a helical gear, the worm wheel can smoothly mesh with the transmission destination gear as well. Therefore, not only the affinity with the conventional transfer element is high, but also the back drivability can be expressed.

Preferably, the rotating frame comprises a worm wheel position adjusting mechanism for adjusting a position of the worm wheel.

According to this configuration, since the position of the worm wheel is adjusted by the worm wheel position adjusting mechanism, it is possible to easily perform adjustment of the backlash.

Preferably, the inner worm gear has 1 or 2 or more threads.

According to such a configuration, by reducing the lead angle, such as by setting the number of threads of the inner worm gear to 1, self-locking can be achieved in the same manner as in a general worm gear. By making the number of strings of the inner worm gear equal to or greater than 2, it is possible to increase the lead angle while suppressing the size of the inner worm gear. Thus, by having a range in the number of threads of the inner worm gear, it is possible to arbitrarily design the expression of back drivability depending on the number of threads and the diameter of the inner worm gear.

Preferably, an outer dimension of the rotating frame is smaller than an inner diameter (tooth tip circle diameter) of the inner worm gear in an axial view of the rotating frame.

According to such a configuration, since the largest dimension of the differential mechanism in the axial view of the rotating frame is the outer diameter of the inner worm gear, it is possible to miniaturize the entire structure.

Advantageous Effects of Invention

It is possible to provide a differential mechanism having two degrees of freedom, which is compact and can reduce differential errors.

BRIEF DESCRIPTION OF DRAWINGS

FIG. 10A and FIG. 10B are perspective drawings showing a drive unit with a differential mechanism according to another embodiment of the present invention.

FIG. 14A to FIG. 14C are explanatory drawings showing a basic configuration of a spherical gear according to the present invention.

FIG. 16A to FIG. 16D are explanatory drawings showing a basic configuration of a saddle gear according to the present invention.

DESCRIPTION OF EMBODIMENTS

Embodiments of the present invention are described below on the basis of the accompanying drawings. It is to be noted that the drawings also include a drawing conceptually (schematically) showing a schematic configuration of a joint device having a differential mechanism as an example of the use of the differential mechanism according to the present invention. In the present specification, a straight line passing through the center of the spherical gear is referred to as a first axis or a second axis. In addition, two orthogonal axes as one embodiment may be referred to as an "r-axis" and an "e-axis" (an axis in a direction orthogonal to the r-axis at the position of torsion)). In addition, of the first axis and the second axis, two axes orthogonal to each other as one embodiment may be referred to as an "X axis" and a "Y axis".

Examples

Figure 1:
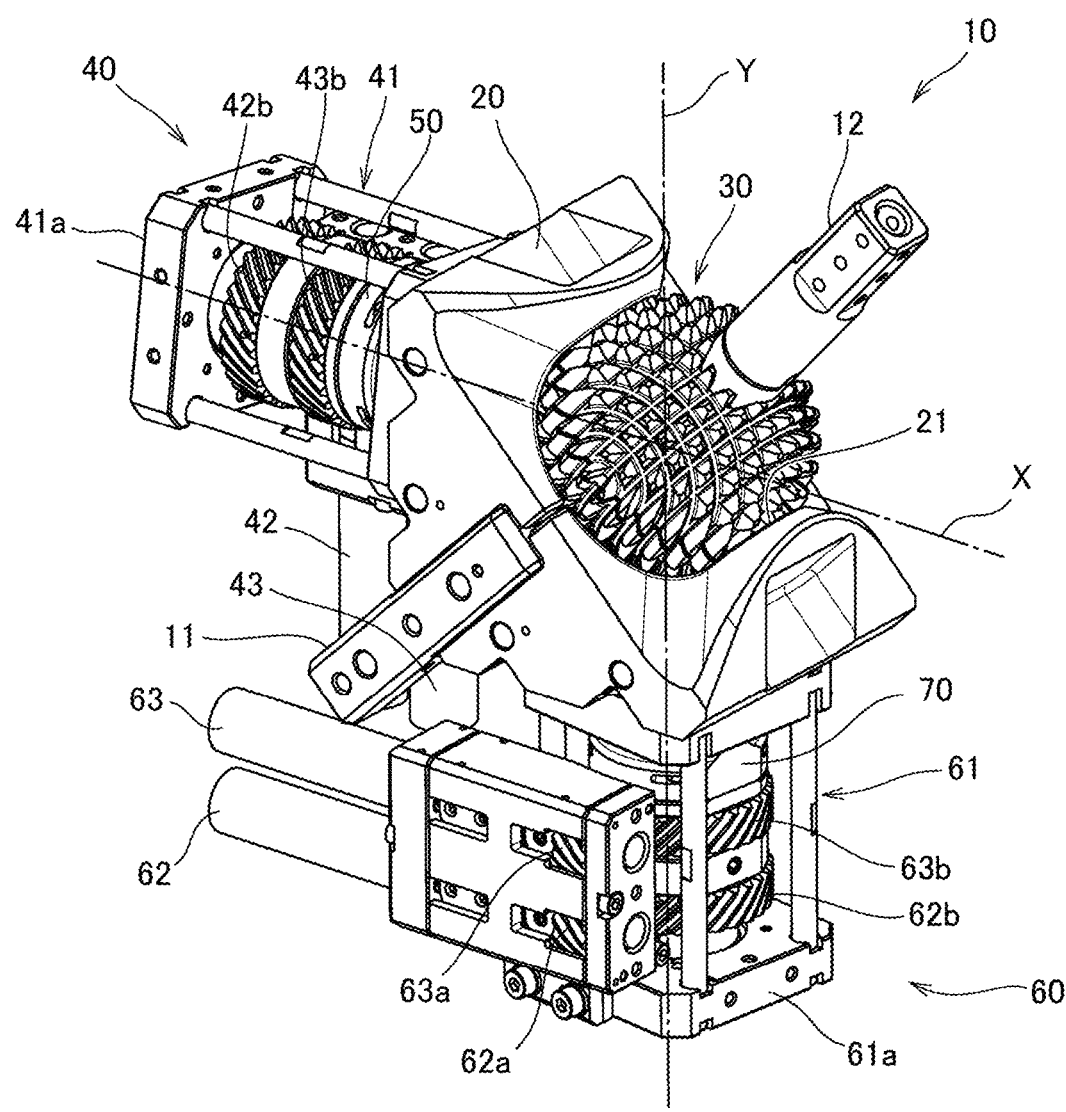
FIG. 1 is a perspective drawing showing an example of a joint device having a differential mechanism according to the present invention.
Figure 2:
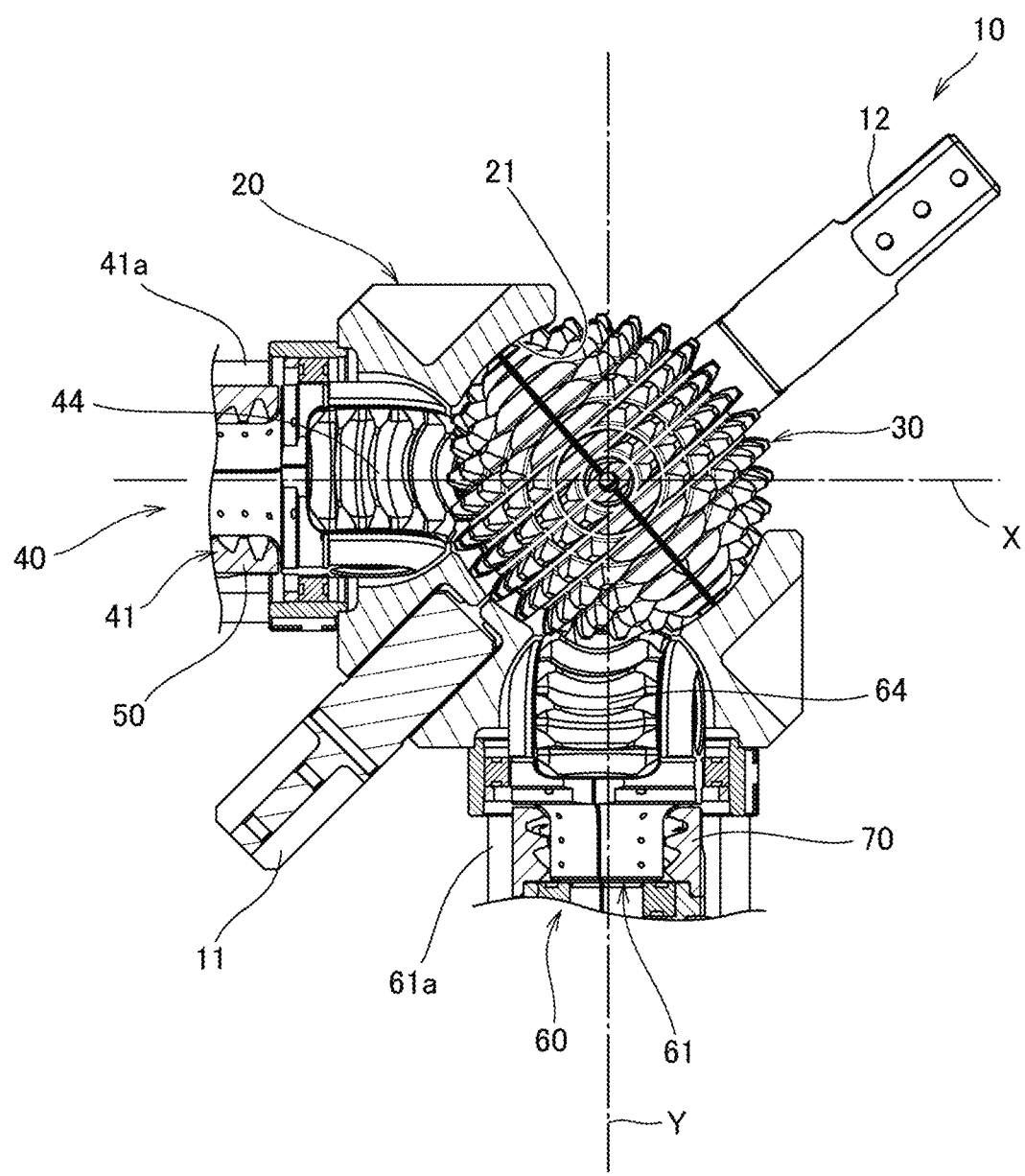
FIG. 2 is a partial cross-sectional drawing showing a joint device with the differential mechanism of FIG. 1.

As shown in FIGS. 1 and 2, a joint device 10 having differential mechanisms 50 and 70 is provided between a first member (hereinafter, also referred to as a supporting member) 11 and a second member (hereinafter, referred to as an output member) 12. The joint device 10 comprises: a holder 20 provided on the supporting member 11 and in which a spherical supporting portion 21 capable of supporting a spherical body is formed; a spherical gear 30 rotatably supported by the spherical supporting portion 21 of the holder 20; a first drive unit 40 provided at a reference position of the X-axis of the holder 20 and driving the spherical gear 30; and a second drive unit 60 provided at a reference position of the Y-axis of the holder 20 and driving the spherical gear 30. The holder 20 is open from the front side to about half of the back surface.

The first drive unit 40 comprises a first saddle gear 44 meshing with the spherical gear 30, and a first drive mechanism 41 that performs a gear rotation of the first saddle gear 44 and performs a rotary drive around a first axis (hereinafter, referred to as an X-axis).

The first drive mechanism 41 comprises: a first main body frame 41a; a shaft rotation motor 42 for performing a drive rotation around the X-axis; a first shaft drive gear (not shown) provided in the shaft rotation motor 42; a first shaft driven gear 42b meshed with the first shaft drive gear to axially rotate the first saddle gear 44; a gear rotation motor 43 for performing a gear rotation; a first worm drive gear (not shown) provided in the gear rotation motor 43; a first worm driven gear 43 meshed with the first worm drive gear to rotate the differential mechanism 50; and a differential mechanism 50 provided between the first saddle gear 44 and the shaft rotation motor 42 and the gear rotation motor 43.

The second drive unit 60 comprises a second saddle gear 64 meshing with the spherical gear 30, and a second drive mechanism 61 that performs a gear rotation of the second saddle gear 64 and performs a rotary drive around a second shaft (hereinafter, referred to as a Y-axis).

The second drive mechanism 61 comprises: a second main body frame 61a; a shaft rotation motor 62 for performing a rotary drive around the Y-axis; a second shaft drive gear 62a provided in the shaft rotation motor 62; a second shaft driven gear 62b meshed with the second shaft drive gear 62a to axially rotate the second saddle gear 64; a gear rotation motor 63; a second worm drive gear 63a provided in the gear rotation motor 63; a second worm driven gear 63b meshed with the second worm drive gear 63a to rotate a differential mechanism 70; and the differential mechanism 70 provided between the second saddle gear 64 and the shaft rotation motor 62 and the gear rotation motor 63.

The rotation shaft of the shaft rotation motor 42 and the rotation shaft of the gear rotation motor 43 of the first drive mechanism 41 are disposed in a direction orthogonal to the X-axis. The rotation shaft of the shaft rotation motor 62 and the rotation shaft of the gear rotation motor 63 of the second drive mechanism 61 are disposed in a direction orthogonal to the Y-axis.

Since the rotation shaft of the shaft rotation motor 42 and the arrangement direction of the gear rotation motor 43 of the first drive mechanism 41 are orthogonal to the X-axis direction, and the rotation shaft of the shaft rotation motor 62 and the arrangement direction of the gear rotation motor 63 of the second drive mechanism 61 are orthogonal to the Y-axis direction, it is possible to reduce the protrusion of the device to the outside and to miniaturize the entire joint device 10. The saddle gears 44, 64 are a type of spur gear, and are formed in the same tooth shape as the spur gear on a pitch circle passing through the center, and a detailed description of the shape is omitted.

Although the present embodiment has been described as the joint device 10, the application is not limited to a joint, and a gear set comprising the spherical gear 30, the first saddle gear 44, and the second saddle gear 64 may be used for an application other than a joint. Further, in the present embodiment, the first axis is the X-axis, and the second axis is the Y-axis orthogonal to the X-axis, but the present invention is not limited thereto, and the first axis and the second axis may be axes having angles that are not orthogonal, such as 45 degrees, 60 degrees, 180 degrees, or the like, or may not be disposed on the XY plane.

Next, the second drive unit 60 and the differential mechanism 70 will be described. Since the first drive unit 40 and the differential mechanism 50 are the same in basic configuration as the second drive unit 60 and the differential mechanism 70, a description thereof is omitted.

Figure 3:
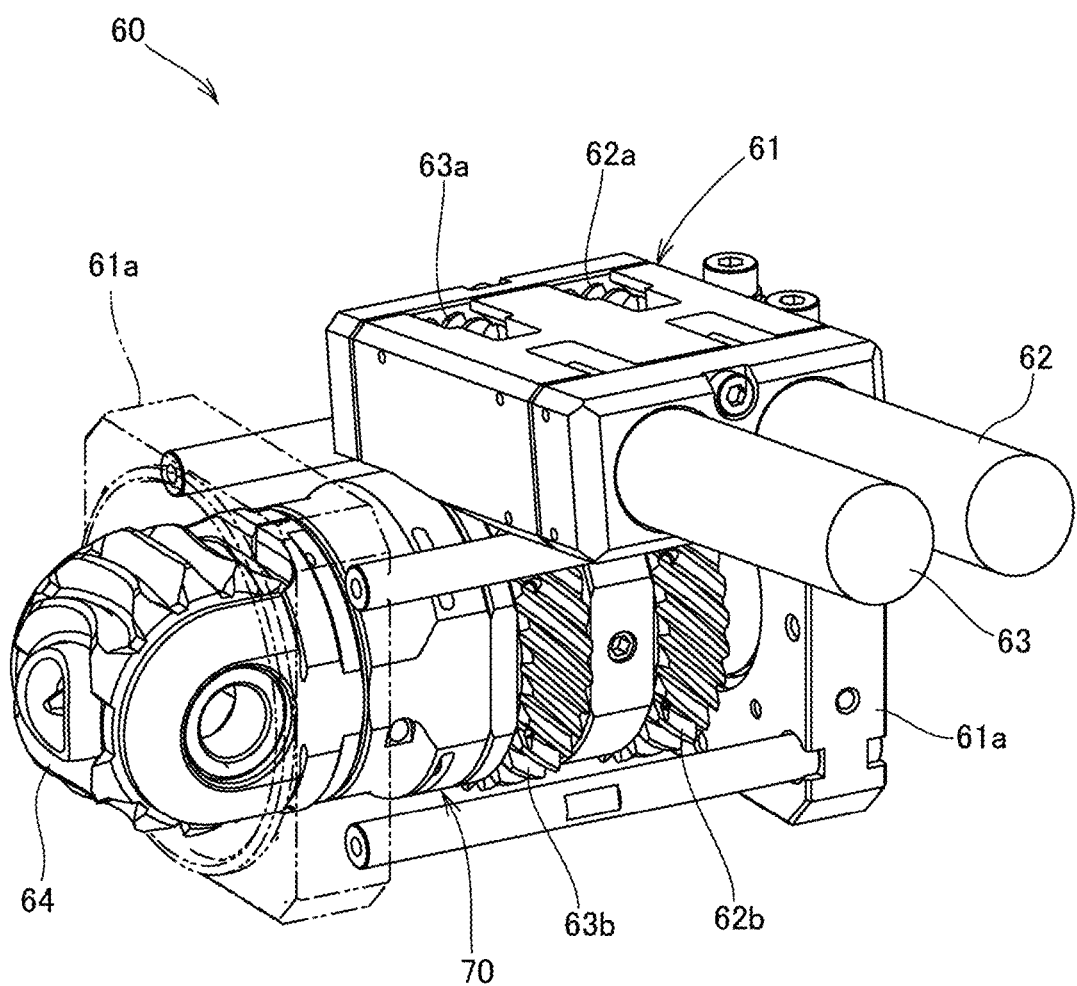
FIG. 3 is a perspective drawing showing a drive unit having a differential mechanism according to the present invention.
Figure 4:
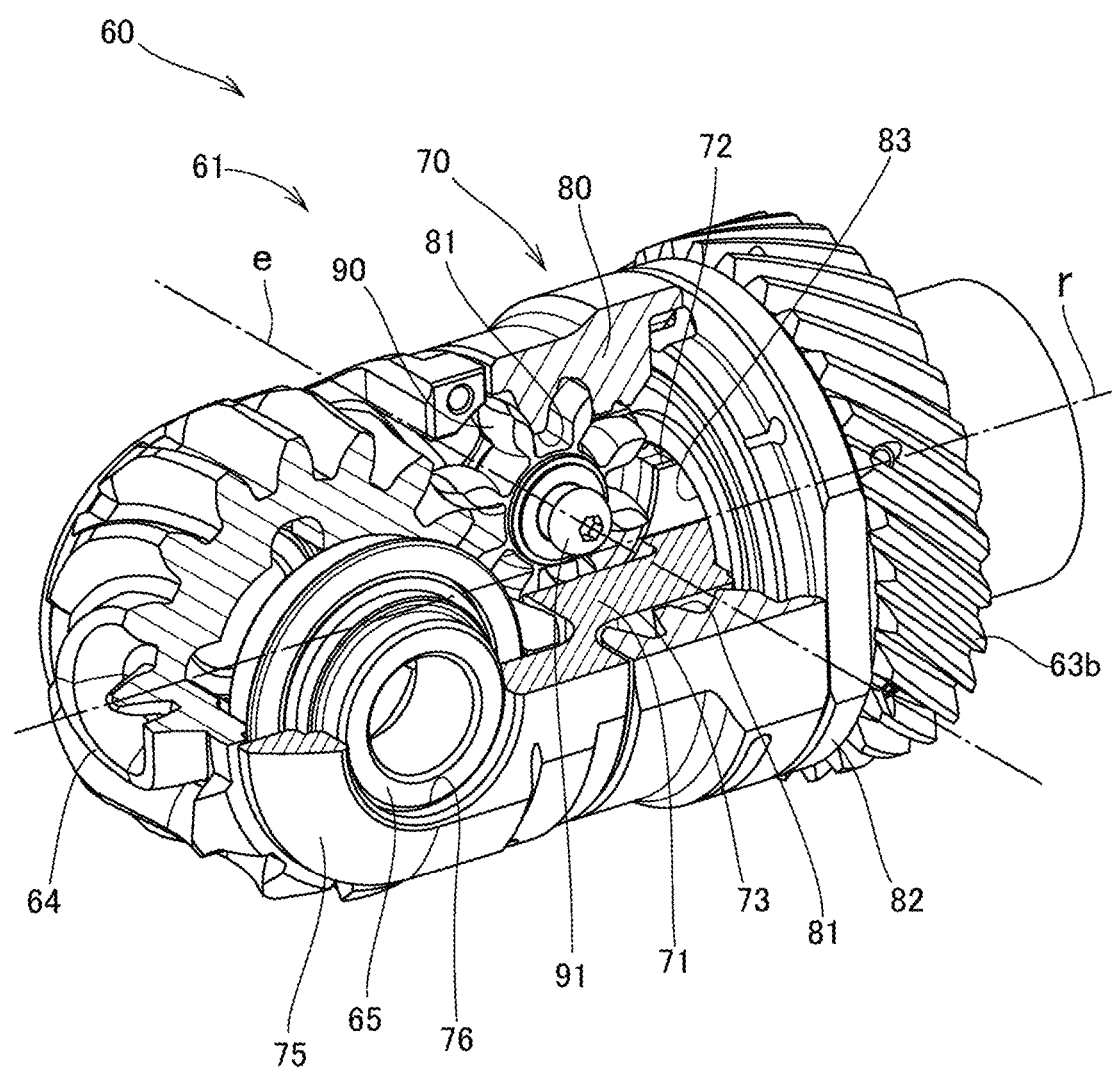
FIG. 4 is a cross-sectional perspective drawing of a main portion showing the differential mechanism of FIG. 3.

As shown in FIGS. 3 and 4, the second drive unit 60 comprises a second saddle gear 64 and a second drive mechanism 61. The second drive mechanism 61 comprises the second main body frame 61a, the shaft rotation motor 62, the second shaft drive gear 62a, the second shaft driven gear 62b, the gear rotation motor 63, the second worm drive gear 63a, the second worm driven gear 63b, and the differential mechanism 70.

The differential mechanism 70 comprises: a rotating frame 71 rotatably provided to the second main body frame 61a; an inner worm gear 80 formed in a cylindrical shape, covering the outer periphery of the rotating frame 71 and rotatably provided coaxially (about the axis r) with the rotating frame 71, and having a spiral tooth 81 formed on a cylindrical inner side; and a worm wheel 90 rotatably provided on the rotating frame 71 at an e-axis (in the direction orthogonal to the axis of the rotating frame 71) orthogonal to the axis r of the rotating frame 71 at a twisted position, and meshing with the inner worm gear 80.

With this configuration, the worm wheel 90 performs two rotation outputs of roll axis rotation and pitch axis rotation, coaxial r with the rotating frame 71 with respect to the two rotation inputs of the rotating frame 71 and the inner worm gear 80.

The inner worm gear 80 has a rotating member 82 provided so as to rotate integrally with the second worm driven gear 63b, and the base end portion of the inner worm gear 80 is provided on the rotating member 82. A through-hole 83 is formed in the center portion of the rotating member 82, and the rotating frame 71 is rotatably inserted into the through-hole 83.

The rotating frame 71 is provided so as to rotate integrally with the second shaft driven gear 62b. The rotating frame 71 comprises an insertion portion 72 rotatably inserted into the through hole 83 of the rotating member 82 and the second worm driven gear 63b, an intermediate portion 73 which is continuous with the insertion portion 72 and opposed to the inner side of the inner worm gear 80, and a worm shaft supporting portion 74 (see FIG. 9A) provided in the intermediate portion 73 and supporting the wheel shaft 91 of the worm wheel 90. Further, the rotating frame 71 has a projecting portion 75 which is continuous with the intermediate portion 73 and projecting forward of the inner worm gear 80 and a rotary shaft supporting portion 76 provided on the projecting portion 75 and supporting the rotary shaft 65 of the second saddle gear 64.

Figure 5A:
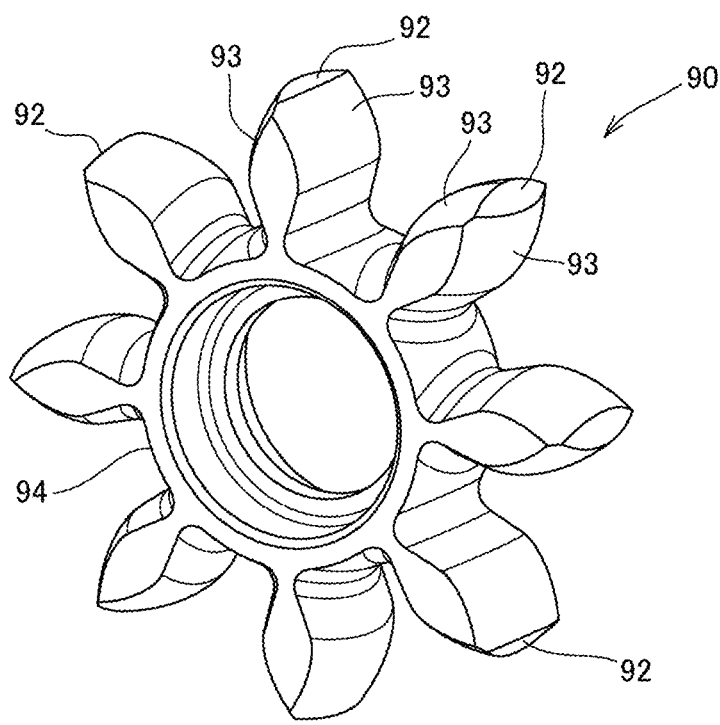
FIG. 5A and FIG. 5B are explanatory drawings showing a worm wheel according to the present invention.
Figure 5B:
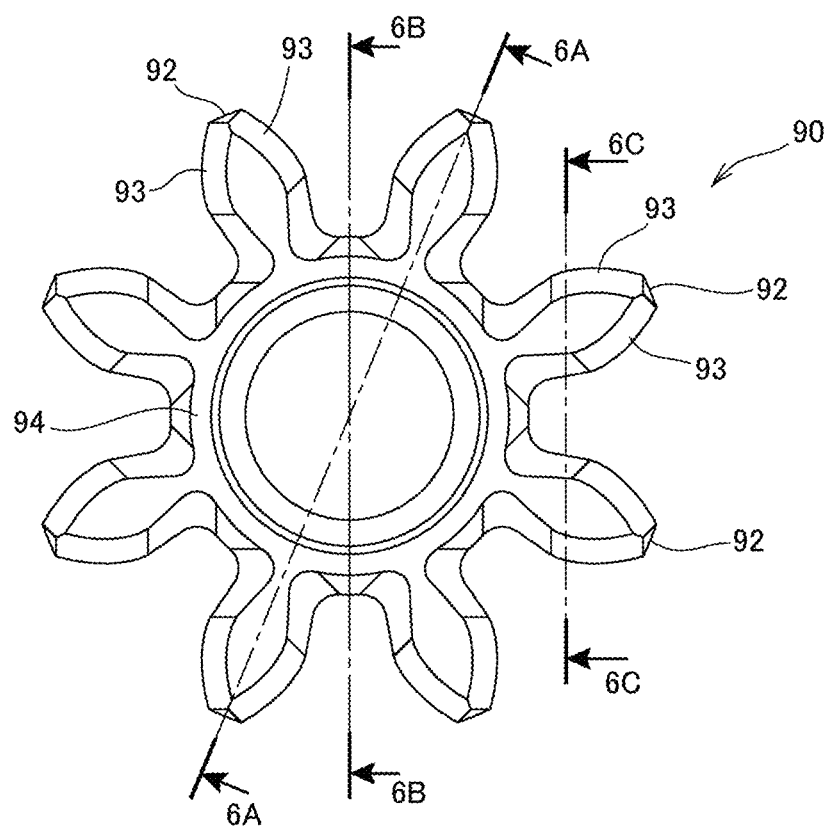
Figure 6A:
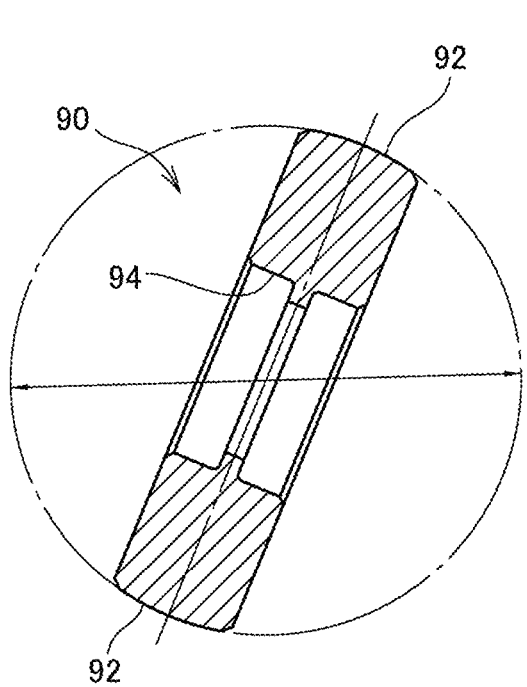
FIG. 6A to FIG. 6D are cross-sectional drawings showing each portion of the worm wheel of FIG. 5A and FIG. 5B.
Figure 6B:
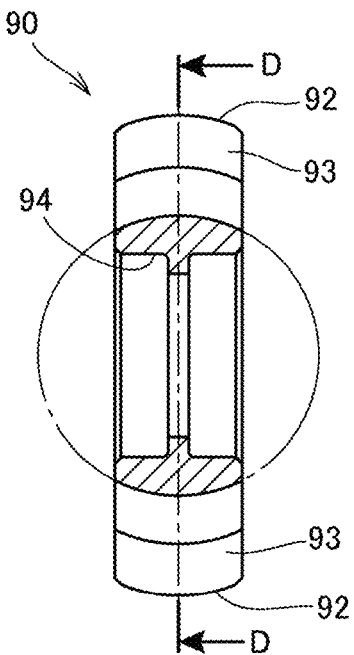
Figure 6C:
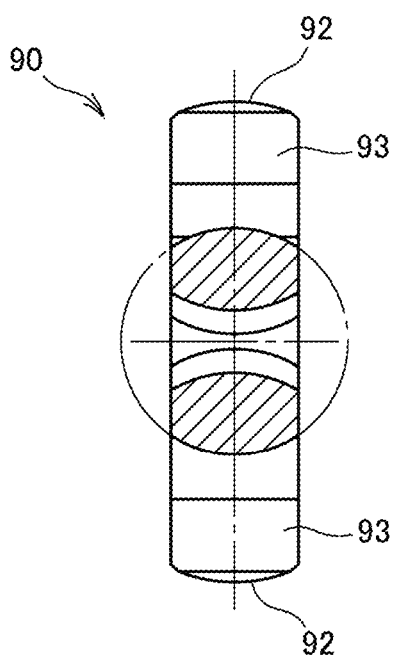
Figure 6D:
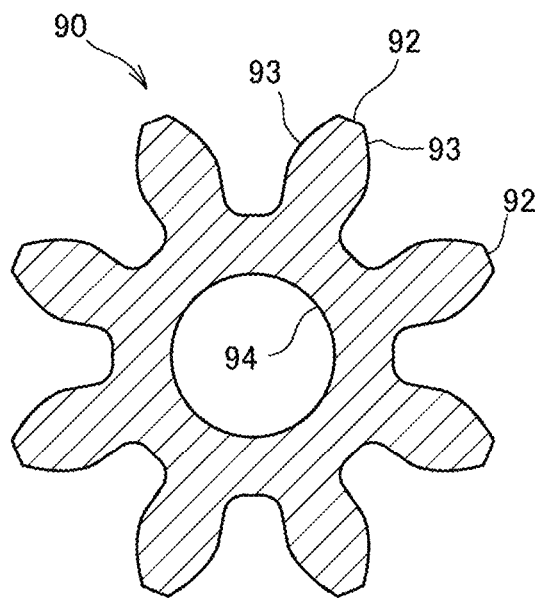

Next, the worm wheel 90 will be described. FIG. 5A is a perspective view of the worm wheel 90, FIG. 5B is a front view of the worm wheel 90, FIG. 6A is a cross-sectional drawing taken along line 6A-6A of FIG. 5B, FIG. 6B is a cross-sectional drawing taken along line 6B-6B of FIG. 5B, FIG. 6C is a cross-sectional drawing taken along line 6C-6C of FIG. 5B, and FIG. 6D is a cross-sectional drawing of a main part of the worm wheel 90.

As shown in FIG. 5A to FIG. 6D, the worm wheel 90 is a spur gear in which the tooth surface 93 of the tooth 92 has a spherical crowning tooth surface. The cross-sectional shape of the worm wheel 90 matches the cross-sectional shape of the spur gear. Thereby, the worm wheel 90 can mesh with the spur gear at the next transmission destination.

In addition, in the example, the worm wheel 90 is a spur gear in which the tooth surface 93 of the tooth 92 has a spherical crowning tooth surface, but is not limited to this, and may be a helical gear having a twist angle that matches the lead angle of the worm gear. Thereby, the worm wheel 90 can mesh with the helical gear at the next transmission destination.

Here, in a general differential mechanism in which an input shaft and an output shaft are orthogonal to each other, a bevel gear is used for each of the input shaft and the output shaft, but the bevel gear cannot mesh with the spur gear. Therefore, in order to transmit from the bevel gear provided on the output shaft to the next spur gear, it is necessary to separately add a spur gear to the same output shaft. Further, since it is necessary to dispose a spur gear separately added so as not to collide with the input shaft, the differential mechanism using the bevel gear becomes large in size.

In this respect, since the worm wheel 90 in the present invention can mesh directly with the spur gear or the helical gear, the differential mechanism 70 can be composed of only one pair of gears of the inner worm gear 80 and the worm wheel 90, and the entire differential mechanism 70 can be miniaturized. In addition, the worm wheel 90 can mesh directly with the next transmission element.

The worm wheel 90 has an annular portion 94 rotatably supported by a wheel shaft 91 (see FIG. 4), and eight teeth 92 radially provided on the outer periphery of the annular portion 94.

In the example, the tooth surface 93 of the tooth 92 of the worm wheel 90 is a spherical crowning tooth surface, but it is not limited thereto, and the tooth surface 93 may be a cylindrical tooth surface having a cylindrical shape. Further, in the example, the number of teeth of the worm wheel 90 is 8, but it is not limited to this, and may be 6, 7, 9, 10, or the like, and may be appropriately changed depending on the diameter and the number of threads of the inner worm gear 80. This allows arbitrary designs for the reduction ratio and the back drivability expression.

In addition, in a differential mechanism in which a bevel gear is generally used, there is a strong limitation between the arrangement and the reduction ratio. That is, when an attempt is made to obtain a certain reduction ratio, the arrangement of the gear and the shaft is inevitably determined. In this respect, according to the present invention, even if the number of threads of the inner worm gear 80 is changed or the number of teeth of the worm wheel 90 is changed, as long as the worm wheel 90 enters the inner side of the inner worm gear 80, there is no limitation on the arrangement, so that the flexibility of the arrangement is high, and the reduction ratio can also be broadly determined.

Figure 7E:
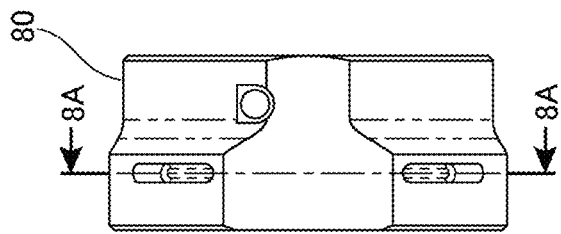
FIG. 7A to FIG. 7E are explanatory drawings showing an inner worm gear according to the present invention.
Figure 7B:
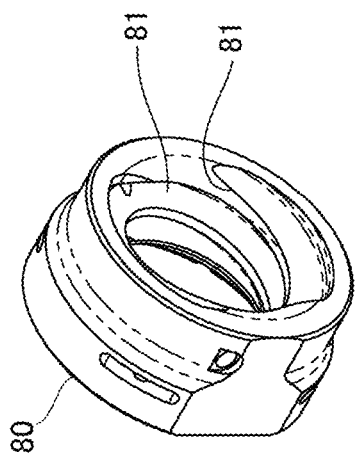
Figure 7D:
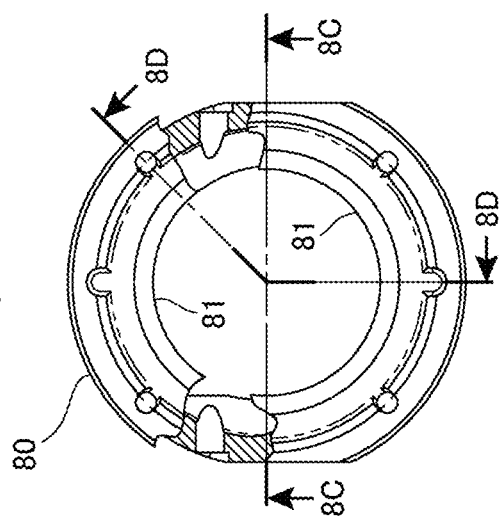
Figure 7A:
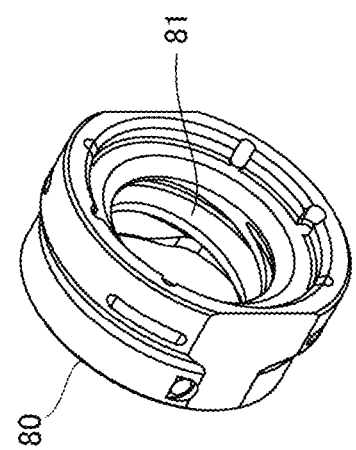
Figure 7C:
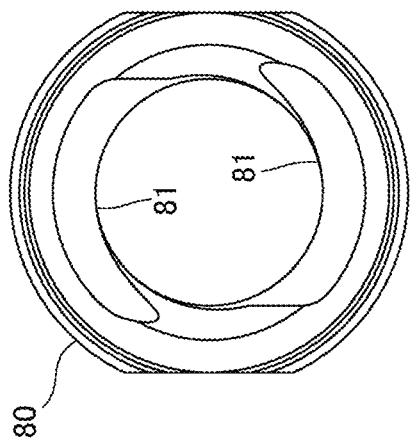
Figure 8A:
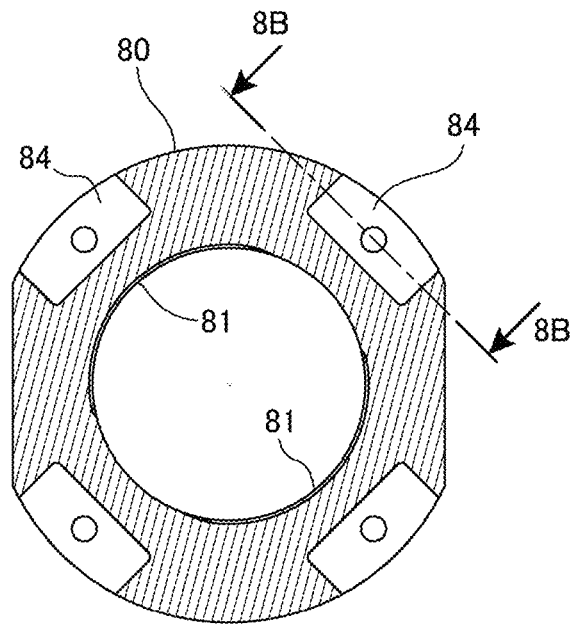
FIG. 8A to FIG. 8D are cross-sectional drawings showing each portion of the inner worm gear of FIG. 7A to FIG. 7E.
Figure 8B:
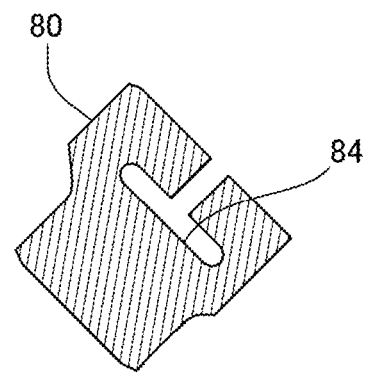
Figure 8C:
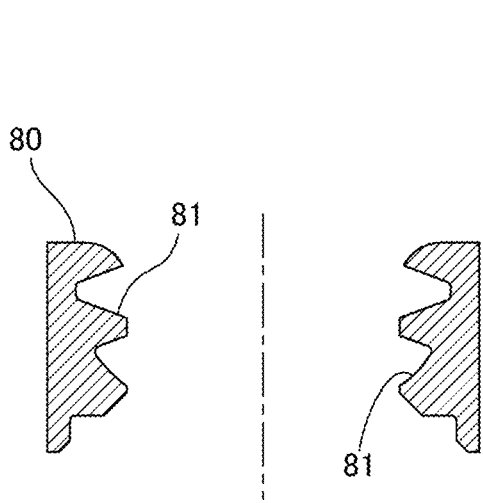
Figure 8D:
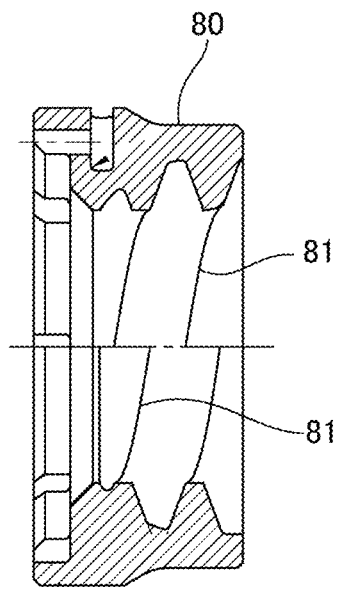

Next, the inner worm gear 80 will be described. FIG. 7A is a perspective view from the base end side of the inner worm gear 80, FIG. 7B is a perspective view from the tip end side of the inner worm gear 80, FIG. 7C is a front view of the inner worm gear 80, FIG. 7D is a partial cross-sectional view from the base end side, FIG. 7E is a side view of the inner worm gear 80, FIG. 8A is a cross-sectional drawing taken along line 8A-8A of FIG. 7E, FIG. 8B is a cross-sectional drawing taken along line 8B-8B of FIG. 8A, FIG. 8C is a cross-sectional drawing taken along line 8C-8C of FIG. 7D, and FIG. 8D is a cross-sectional drawing taken along line 8D-8D of FIG. 7D.

The inner worm gear 80 has a cylindrical shape, and teeth 81 are spirally formed on the inside of the cylindrical shape along the r-axis (see FIG. 4). The inner diameter of the inner worm gear 80 is larger than the outer diameter of the intermediate portion 73 of the rotating frame 71 (see FIG. 4). The number of threads of the inner worm gear 80 is 2. In the example, the number of threads of the inner worm gear 80 is set to 2, but it is not limited thereto, and may be 1, 3 or more or may be changed.

By reducing the lead angle, such as by setting the number of threads of the inner worm gear 80 to 1, self-locking can be achieved in the same manner as in a general worm gear. By setting the number of threads of the inner worm gear 80 to two or more, it is possible to increase the lead angle while suppressing the size of the inner worm gear 80. In this manner, by having a range in the number of threads of the inner worm gear 80, it is possible to arbitrarily design the expression of back drivability depending on the number of threads and the diameter of the inner worm gear 80.

In addition, the inner worm gear 80 is formed with a fixing groove 84 for fixing to the rotating member 82 (see FIG. 4). For example, a plate-shaped nut is placed in the fixing groove 84 from the outer circumferential side of the inner worm gear 80, and the inner worm gear 80 is fastened by a fastening member from the rotating member 82 side, whereby the inner worm gear 80 is fixed to the rotating member 82. The fixing direction is not limited to this.

Figure 9A:
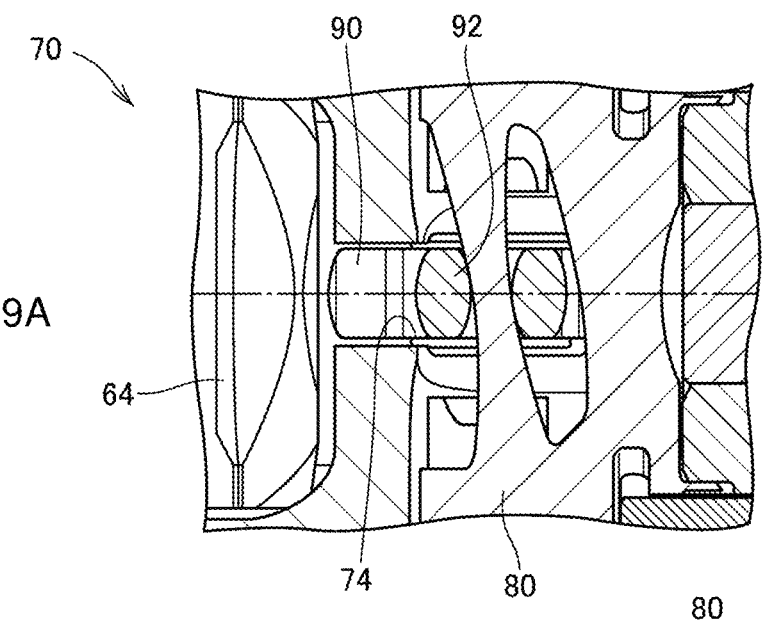
FIG. 9A to FIG. 9C are explanatory drawings showing a meshing state between the worm wheel and the inner worm gear according to the present invention.
Figure 9B:
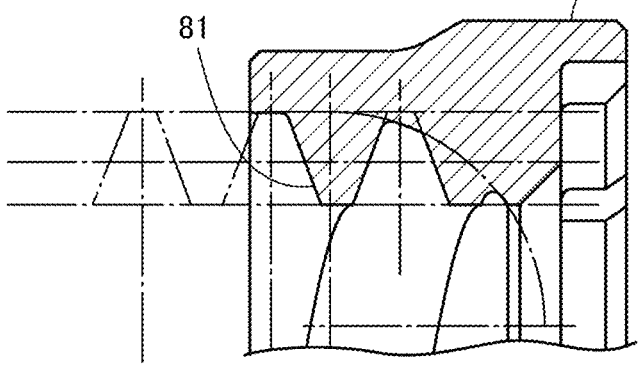
Figure 9C:
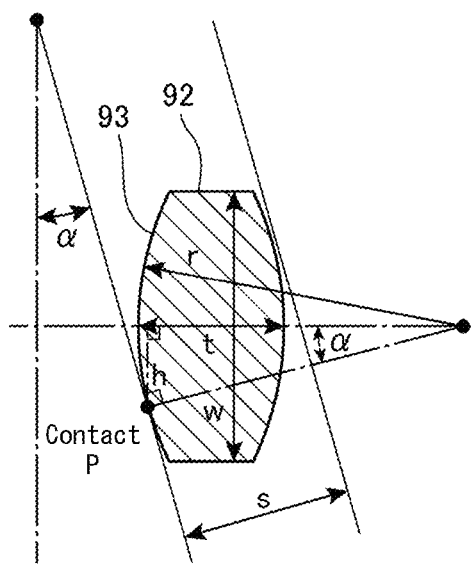

Next, the crowning amount of the tooth 92 of the worm wheel 90 will be described. FIG. 9A is a cross-sectional drawing of the meshing portion between the inner worm gear 80 and the worm wheel 90, FIG. 9B is a partially enlarged drawing of FIG. 8D, and FIG. 9C is a cross-sectional drawing of the tooth 92 on the pitch circle of the worm wheel 90.

FIG. 6D and FIG. 9A to FIG. 9C will be referred to. For example, in FIG. 9A, the inner worm gear 80 and the second saddle gear 64 are in mesh with each other, and when the second saddle gear 64 is replaced with a normal spur gear, one design condition is that the cross-sectional shape of the worm wheel 90 matches the cross-sectional shape of the spur gear in order to mesh with the spur gear.

Then, the thickness of the tooth 92 in the cross-section as shown in FIG. 9A is determined. In this case, the thickness t [mm] of the tooth 92 on the reference pitch circle of the worm wheel 90 is determined by $$t = m \times \pi/2,$$

wherein m is a module of teeth. This is a common gear formula. However, the position of the cross-sectional view of FIG. 9A is not accurate and is for purposes of explanation. Essentially, the cylindrical inner worm gear 80 shall be viewed at a cross-section at the pitch cylindrical surface. Further, the thickness t of the tooth is a length on the reference pitch circle in FIG. 6D.

Next, the lead angle of the tooth 81 of the inner worm gear 80, the inclination angle $\alpha$[deg] of helical line, is determined. The angle is determined by the number of threads n of the teeth, the module m [mm] of the teeth 81, and the diameter d [mm] of the pitch cylindrical surface of the inner worm gear 80. The m is the same as the worm wheel 90. For example, when n=1, the movement amount b [mm] of the worm wheel 90 in the circumferential direction when the inner worm gear 80 makes one revolution moves by one pitch. That is, it is as follows.

$$b = \pi \times m$$

If n=2, the movement amount b moves by 2 pitches, and if n=3, the movement amount b moves by 3 pitches, so that the movement amount when one turn is performed is as follows.

$$b = \pi \times m \times n$$

Then, the inclination angle (lead angle) α of the tooth line of the worm tooth 81 on the pitch cylindrical surface is obtained as the following formula.

$$\alpha = \arctan(b/(\pi \times d)) = \arctan(\pi \times m \times n/(\pi \times d)) = \arctan(m \times n/d)$$

This means the angle of the triangle formed by the lateral slide movement amount π×d [mm] and the longitudinal feed amount b [mm] when one turn is performed.

Next, the design parameters are geometrically calculated. The parameters to be determined are the tooth width w [mm], the crowning radius r [mm], and the width s [mm] of the valley of the inner worm gear 80.

The purpose of the crowning is a smooth contact with the inner worm tooth surface, and the contact P in FIG. 9C should be anywhere in the tooth width w. That is, the following relationship is obtained.

$$h < w/2$$

Here, the design upper limit is as follows.

$$h = w/2$$

Then, the relationship between the design upper limit and the crowning amount r is as follows.

$$h = r \sin(\alpha) = w/2$$

Therefore, $$r = w/(2 \times \sin(\alpha)).$$

However, since the minimum value of r is half of t, the following condition is satisfied.

$$r \geq t/2$$

If r=t/2, the tooth of the worm wheel 90 is conical. Since t is fixed, it is necessary to adjust the width of the tooth groove of the inner worm gear 80. This means that the cross-sectional shape of the inner worm gear 80 of FIG. 9B should originally have a negatively displaced tooth shape, unlike a normal rack gear.

The theoretical groove width u [mm] of the tooth is $$u = \pi \times m/2,$$

which means half of the pitch width. In the case of a normal gear, s=u is the theoretical value. On the other hand, the width s [mm] of the groove of the tooth of the inner worm gear 80 of the present invention is as follows, based on the previous geometric considerations.

$$s = 2r - (2r - t)\cos(\alpha)$$

For example, in the case of a=0, i.e., a rotating body of the inner rack gear in which there is no lead angle, s=t=π×m/2, and s=u is obtained (this means that the teeth cannot be fed).

On the other hand, separating the distance between the normal spur gear and the rack gear is equivalent to relatively widening the width of the tooth groove of the rack. Therefore, also in the case of the inner worm gear 80 and the worm wheel 90 of the present invention, by separating the distances in the same manner, it is possible to mesh with each other without intentionally cutting a special inner worm tooth surface based on s. At this time, the width e [mm] to be expanded is represented by $$e = s - u.$$

Considering only one tooth surface, an expansion of the tooth groove of e/2 is necessary.

Since the tooth angle, the tooth thickness angle of the rack gear is 20 degrees, the increment y [mm] of the distance between the inner worm gear 80 and the worm wheel 90 is expressed as follows.

$$y = (e/2)/\tan(20°)$$

The summary is as follows.

The set values are a module m, a number of threads n, an inner worm gear pitch cylinder inner diameter d, and a tooth width w.

| | |
|---|---|
| Tooth thickness t [mm] | t = m × π/2 |
| Tilt angle α [rad] | α = arctan(m × n/d) |
| Crowning amount r [mm] | r < w/(2 × sin(α)) |
| Worm gear tooth groove width s [mm] | s = 2r − (2r − t)cos(α) |
| Increment y [mm] of the inter-axis distance | y = (e/2)/tan(20°) |

However, regarding the tooth tip inner diameter da=d−2×m of the inner worm gear, and the pitch circle diameter Dp=z×m of the inner worm wheel, Dp<da.

Next, the drive unit 60 having the differential mechanism 70 according to another embodiment will be described. Incidentally, since the basic configuration is the same as that of FIG. 3 and FIG. 4, the same components are denoted by the same reference numerals, and a description thereof is omitted.

As shown in FIG. 10A, in a differential mechanism 70 according to another embodiment, the shaft rotation motor 62 is directly connected to a rotating frame (inner shaft) 71. The gear rotation motor 63 drives the inner worm gear 80. Both the rotating frame (inner shaft) 71 and the inner worm gear 80 rotate around the axis r. The inner worm gear 80 has a cylindrical shape in which teeth 81 are engraved on the inner side, and meshes with a worm wheel 90 disposed on the inner side. The worm wheel 90 and the spur gear 66 are installed around the rotation axis r of the rotating frame (inner shaft) 71 via a bearing. The worm wheel 90 can transmit power from the inner worm gear 80 to the spur gear 66.

As shown in FIG. 10B, a differential mechanism 70 according to yet another embodiment is an example of a configuration in which the differential mechanism 70 shown in FIG. 10A is further miniaturized. In this configuration, the rotation axis of the worm wheel 90 and the rotation axis of the inner worm gear 80 can substantially coincide with each other.

Next, the operation of the differential mechanism 70 according to the example and the operation of the differential mechanism 100 according to the comparative example will be described.

Figure 11A:
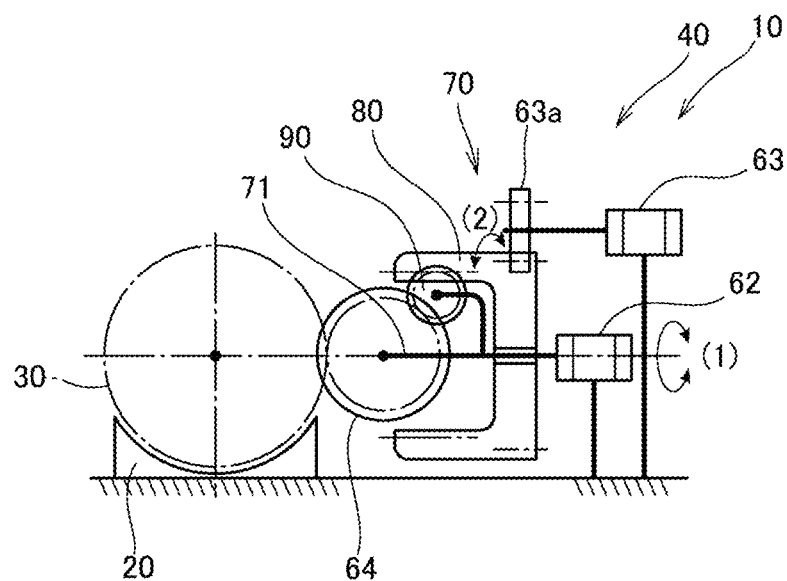
FIG. 11A to FIG. 11C are operation drawings of the differential mechanism according to the example and an operation drawing of the differential mechanism according to the comparative example.

FIG. 11A is an operation drawing of the joint device 10 comprising the differential mechanism 70 of the example, and the joint device 10 is provided with: a shaft rotation motor 62 fixed to a portion integral with the holder 20; a rotating frame 71 rotatably provided to the shaft rotation motor 62; a second saddle gear 64 rotatably provided to the rotating frame 71 and a worm wheel 90 meshed with the second saddle gear 64; a gear rotation motor 63 fixed to the holder 20; a cylindrical inner worm gear 80 rotatably provided to the gear rotation motor 63 via a second worm drive gear 63a and having a worm groove cut inwardly so as to mesh with the worm wheel 90; and a spherical gear 30 rotatably supported by the holder 20 and meshed with the second saddle gear 64.

In the differential mechanism 70, the saddle gear 64 performs a gear rotation, a shaft rotation, or a stop of the spherical gear 30, the shaft rotation motor 62 causes the rotary frame 71, the worm wheel 90, the second saddle gear 64, and the spherical gear 30 to integrally shaft rotate as shown by the arrow (1), and the gear rotation motor 63 rotates the inner worm gear 80 via the second worm drive gear 63 as shown by the arrow (2), while the differential mechanism 70 performs gear rotations of the worm wheel 90, the second saddle gear 64, and the spherical gear 30 as in a general spur gear train. In order to drive the constrained two degrees of freedom of rotation among the three degrees of freedom of rotation of the spherical gear 30, the second saddle gear 64 needs two degrees of freedom of rotation.

Figure 11B:
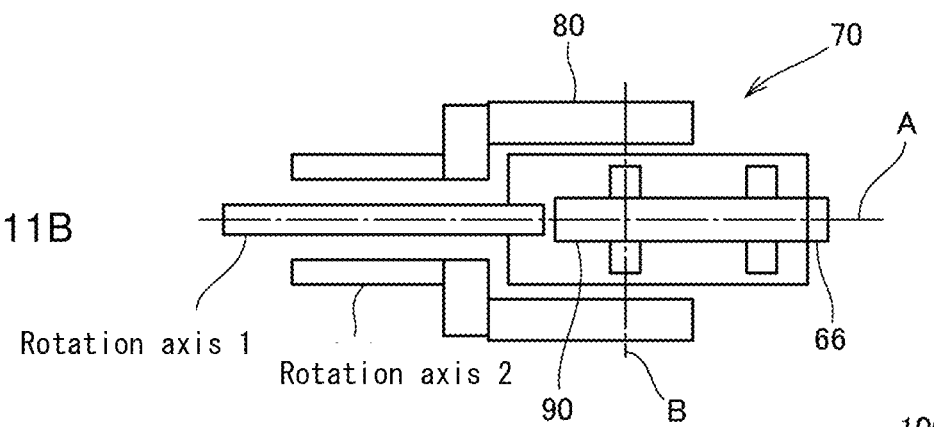

FIG. 11B is an operation drawing of the differential mechanism 70 of the example, and the worm wheel 90 as an output element can be disposed inside the cylindrical inner worm gear 80 as an input element. That is, only this pair of gears enables a straightforward arrangement of mechanism elements in terms of machine design in which the input element and the output element are both close to the A-axis. This realizes miniaturization and high precision.

Figure 11C:
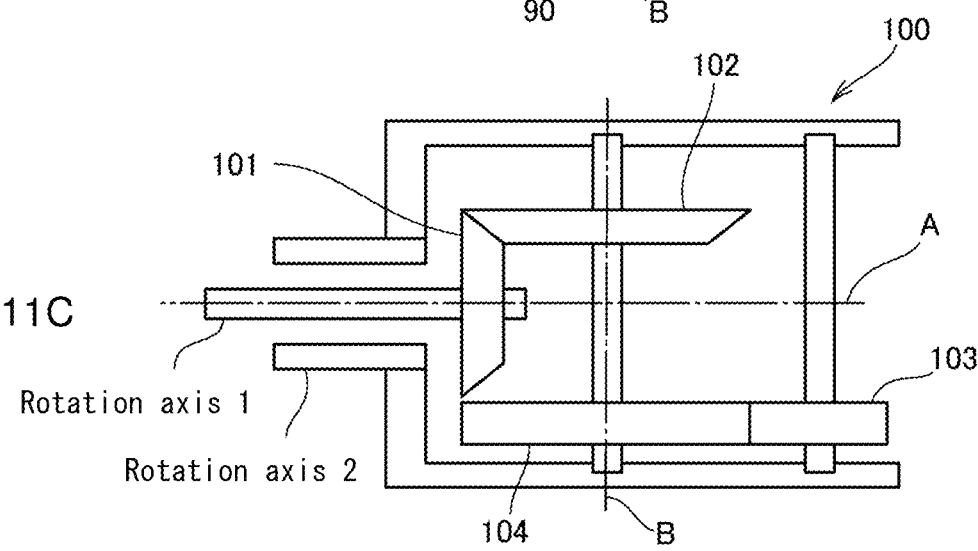

FIG. 11C is an operation drawing of the differential mechanism 100 of the comparative example. In the differential mechanism 100 of the comparative example, since the bevel gear 102 cannot mesh with the transmission destination element (spur gear 103), an extra spur gear 104 for transmitting power from the bevel gear 101 to the spur gear 103 is necessary.

In this respect, in the differential mechanism 70 of the example, since the worm wheel 90 can act as a spur gear, an extra spur gear 104 for meshing with the spur gear 66 of the transmission destination becomes unnecessary. Therefore, it can be configured with the minimum number of components, and cost reduction can be achieved. Further, in addition to being able to design a high reduction ratio, it is also possible to design one-way (self-lock) power, which is a feature of common worm gears.

Next, the operation and effect of the differential mechanism 70 described above will be described.

In the configuration of the example of the present invention, the differential mechanism 70 comprises: an inner worm gear 80 formed in a cylindrical shape, covering the outer periphery of the rotating frame 71 and rotatably provided coaxially with the rotating frame 71, and having a spiral tooth formed on the cylindrical inner side; and a worm wheel 90 rotatably provided on the rotating frame 71 in a direction orthogonal to an axis of the rotating frame 71 and meshing with the inner worm gear 80. Since the inner worm gear 80 has the helical teeth 81 formed on the inner side of the cylindrical portion and the worm wheel 90 is disposed on the inner side of the inner worm gear 80, the differential mechanism 70 can be miniaturized.

Further, in the inner worm gear 80 of the example, since the tooth 81 are formed in a spiral shape directly on the inside of the cylindrical portion forming the outer shape, only the worm wheel 90 is disposed on the inner side thereof, so that the differential mechanism 70 can be downsized even compared with the conventional PTL 1.

Further, in the present invention, since the tooth 81 is formed in a spiral shape directly inside the cylindrical portion forming the outer shape of the inner worm gear 80, it is possible to reduce the number of transmission elements (the number of parts) to reduce the differential errors. Thus, the present invention can provide a differential mechanism 70 having two degrees of freedom, which is compact and can reduce the differential errors.

Further, since the tooth surface 93 of the pinion (tooth) 92 of the worm wheel 90 is a cylindrical tooth surface or a spherical crowning tooth surface, it can smoothly mesh with the tooth surface of the inner worm gear 80 inclined with respect to the axis of the worm wheel 90 on the pitch circle, and can smoothly mesh with the tooth surface of the transmission destination gear. Therefore, the design affinity with the conventional transmission element is high, and the back drivability can be expressed.

Further, since the worm wheel 90 is a helical gear and the tooth bars are twisted, the worm wheel 90 smoothly meshes with the tooth bars of the inner worm gear 80 inclined with respect to the axis of the worm wheel 90 on the pitch circle. In this case, when the transmission destination gear is also a helical gear, the worm wheel 90 can also mesh smoothly with the transmission destination gear as well. Therefore, the design affinity with the conventional transmission element is high, and the back drivability can be expressed.

Further, the rotating frame 71 is provided with a worm wheel position adjusting mechanism (not shown) for adjusting the position of the rotation axis e of the worm wheel 90. The adjustment mechanism is provided with an elongated hole and a slider structure so as to be able to slide finely in the radial direction and the axial direction with respect to the axis r of the rotating frame 71. Therefore, since the position of the rotation axis e of the worm wheel 90 is adjusted by the worm wheel position adjusting mechanism, it is possible to easily adjust the backlash between the inner worm gear 80 and the backlash between the saddle gear 64. The configuration of the worm wheel position adjusting mechanism is an example, and is not limited to this, and may be any other configuration as long as it can slide finely in the radial direction and the axial direction with respect to the axis r of the rotating frame 71.

Further, the outer dimension of the rotating frame 71 is smaller than the inner diameter (tooth tip circle diameter) of the inner worm gear 80 in the axial view of the rotating frame 71. Therefore, since the largest dimension of the differential mechanism 70 in the axial direction of the rotating frame 71 is the outer diameter of the inner worm gear 80, it is possible to miniaturize the entire structure.

The present invention is not limited to the number of teeth of the gear shown in the drawing of the example. Further, in the example, the transmission destination of the worm wheel 90 is the saddle gear 64, but it is not limited to this, and may be a general spur gear, a helical gear, or the like, and the type of the gear is not limited as long as power can be transmitted.

That is, as far as the operations and effects of the present invention are exhibited, the present invention is not limited to the examples.

The present invention also relates to a gear set and a joint device using the same, and more particularly, to a joint device having three degrees of freedom of rotation provided between a supporting member and an output member.

In recent years, automation of robots has been promoted, and the degree of freedom of joints of robots tends to increase. Along with this, many attempts have been made to provide one joint device with many degrees of freedom.

As a joint device that gives such one joint multiple degrees of freedom of rotation, there are a wire and a linkage device. However, the wire and the link mechanism are structurally limited in the rotatable angle of the sphere. As a measure against this, a joint device disclosed in Patent Literature (Japanese Unexamined Patent Publication No.

Hei 8-088987) in which a spherical body is rotated without limiting the angle of rotation of the sphere by using a vibrator is known.

In the joint device of Patent Literature (Japanese Unexamined Patent Publication No. 8-088987), a spherical rotor is housed in a cavity of a casing in which a substantially circular opening is formed, and is supported by only four stators. The stator is composed of a rotary type surface vibrator, and contact pieces are protruded at a constant pitch on a substantially dish-shaped outer peripheral surface, and are arranged in an annulus. The rotor is supported so that the contact piece is in contact with the rotor, and when the stator is vibrated by the principle of the ultrasonic motor, the surface of the rotor moves along the circumferential direction of the stator. As a result, the rotor rotates around the axial center of the stator, and a joint device having three degrees of freedom can be obtained.

Incidentally, when a joint device is used in a robot, a large load may be applied to the robot, and the load is transmitted to the joint device. However, in the joint device of the above-mentioned Patent Literature, since the rotor is held by the frictional force between the rotor and the stator, when a large load is applied, the rotor slips with respect to the stator, and the accuracy of force transmission sometimes decreases. Further, as a countermeasure against this, a joint device using a gear could be considered, but at present, only a joint device using a gear having one degree of freedom of rotation or two degrees of freedom of rotation as a single unit exists, and it has been difficult to miniaturize a robot due to the need to combine a plurality of joints. Therefore, there is a need for a joint device that uses a gear capable of transmitting a large torque and that has three degrees of freedom of rotation on its own.

In view of the above, it is also an object of the present invention to provide a joint device having three degrees of freedom of rotation capable of transmitting a large torque, and a gear set used in the same.

[1] A joint device having three degrees of freedom disposed between a first member and a second member, wherein the joint device comprises:
 a holder provided on the first member and having a spherical support portion capable of supporting a sphere formed thereon,
 a spherical gear rotatably supported by the spherical support portion of the holder, the spherical gear having the second member and a tooth structure in which a contour of a spur gear formed in a virtual plane comprising a first ground axis and a second ground axis passing through a center of the sphere is cut around the first ground axis and the second ground axis, respectively, on the entire surface of the sphere,
 a first drive unit provided on the holder and driving the spherical gear, and
 a second drive unit provided on the holder and driving the spherical gear,
 wherein the first drive unit comprises a first saddle gear meshing with the spherical gear, and a first drive mechanism for driving a rotation of the first saddle gear around a first axis passing through a center of the spherical gear and a center of the first saddle gear while performing a gear rotation of the first saddle gear,
 the first saddle gear is capable of constantly constraining two degrees of freedom of rotation other than the one around the first ground axis among three degrees of freedom of rotation of the spherical gear by three interactions of a gear rotation transmitting a force by which the meshing portion moves in a longitude direction with respect to the first ground axis of the spherical gear, a shaft rotation transmitting a force around the first axis, and a lateral slide not transmitting a force of the meshing portion sliding in a latitude direction; and comprises a conical, conical trapezoidal, or annular drive pole tooth, and a curved tooth having a predetermined tooth width and a tooth surface with a curved shape,
 the second drive unit comprises a second saddle gear meshing with the spherical gear, and a second drive mechanism for driving a rotation of the second saddle gear around a second axis passing through the center of the spherical gear and the center of the second saddle gear while performing a gear rotation of the second saddle gear, and
 the second saddle gear is capable of constantly constraining two degrees of freedom of rotation other than the one around the second ground axis among the three degrees of freedom of rotation of the spherical gear by the three interactions of a gear rotation transmitting a force by which the meshing portion moves in the longitude direction with respect to the second ground axis of the spherical gear, a shaft rotation transmitting a force around the second axis, and a lateral slide not transmitting a force of the meshing portion slides in the latitude direction, and comprises a conical, conical trapezoidal, or annular drive pole tooth and a curved tooth having a predetermined tooth width and a tooth surface with a curved shape.

According to this configuration, the holder is provided with the first drive unit and the second drive unit for driving the spherical gear. Since the first drive unit and the second drive unit are fixed to the holder, it is advantageous to increase the output of the power source. In addition, since each of the first drive unit 40 and the second drive unit 60 transmits the driving force to the spherical gear 30, a so-called parallel mechanism capable of combining the forces can be obtained. In the prior art, there has been a technique in which teeth are provided on a portion of a sphere, but this limits the range of motion to a narrow range in which the teeth are provided. In this respect, in the present invention, since the entire surface of the sphere has two overlapping tooth structures in which the contour of the spur gear formed in the virtual plane including the first ground axis and the second ground axis passing through the center of the sphere is cut around the first ground axis and the second ground axis, respectively, the movable range can be enlarged without limitation.

On the other hand, each tooth structure cut around the first ground axis or the second ground axis of the spherical surface has a property of being distorted as the tooth structure is closer to the polar point, such as the latitude line and the longitude line of the Earth globe. That is, in combination with a general spur gear, transmission is established only in the equator portion. In this respect, in the present invention, this problem was solved by the first saddle gear and the second saddle gear that can mesh with the spherical gear. The first saddle gear and the second saddle gear have a special tooth structure that does not exist in the prior art and corresponds to the distortion of the tooth structure in the spherical gear. Specifically, the first saddle gear and the second saddle gear have a conical, conical trapezoidal, or annular drive pole tooth that meshes with a driven pole on the first ground shaft or the second ground shaft of the spherical gear while having a predetermined tooth width, and curved tooth with a curved shape that mesh with each other except for the driven pole. The teeth mesh with the tooth structure of the spherical gear cut around the first ground axis or the second ground axis to obtain three interactions of: a gear rotation transmitting a force by which the meshing portion moves in the longitude direction with respect to the axis forming the tooth structure; a shaft rotation transmitting a force, due to having a predetermined tooth width, about the first axis or the second axis; and a lateral slide not transmitting a force by which the meshing portion moves in the latitude direction. That is, the saddle gear meshed with the tooth structure of the spherical gear cut around the first ground axis can always constrain two degrees of freedom of rotation other than the degree of freedom of rotation around the first ground axis among three degrees of freedom of rotation of the spherical gear, and in the same manner, the saddle gear meshed with the tooth structure around the second ground axis can always constrain two degrees of freedom of rotation other than the degree of freedom of rotation around the second ground axis among three degrees of freedom of rotation of the spherical gear. Therefore, the saddle gear can continuously transmit power at an unlimited rotation angle as in a normal spur gear pair without breaking the mesh not only at the equator portion of the spherical gear but also at the driven pole.

Further, in the present invention, as a suitable freedom degree design method, by appropriately disposing two saddle gears having two degrees of freedom of rotation with respect to the two tooth structures of the spherical gear, driving of the spherical gear in three degrees of freedom of rotation has been realized. Specifically, a first saddle gear and a second saddle gear were installed for one spherical gear, and the first saddle gear and the second saddle gear corresponded to two tooth structures around the first ground axis and the second ground axis of the spherical gear, respectively. In addition, the first saddle gear and the second saddle gear are each incorporated in the first drive mechanism of the first drive unit or the second drive mechanism of the second drive unit to be provided with the driving ability of two degrees of freedom of rotation, thereby driving two degrees of freedom constrained by each among three degrees of freedom of rotation of the spherical gear. By having a phase difference between the two tooth structures of the spherical gear, a total of four driven degrees of freedom due to the first saddle gear and the second saddle gear are appropriately arranged on the spherical gear, and it is possible to constantly constrain (drive) all three degrees of freedom of rotation of the spherical gear. Thus, according to the present invention, it is possible to provide a joint device having three degrees of freedom of rotation based on the meshing of gears capable of transmitting a large torque.

[2] Preferably, there is provided the joint device, wherein the tooth structure of the spherical gear meshes with the spur gear at an intermediate portion between two driven poles on the first ground axis, and has a shape in which a curvature increases as the tooth structure approaches the driven pole on the first ground axis, and in the first saddle gear and the second saddle gear, a curvature of the tooth surface of the curved tooth decreases as the first saddle gear and the second saddle gear move away from the drive pole tooth in the circumferential direction.

According to this configuration, the shapes of the teeth of the first saddle gear and the second saddle gear can be matched in correspondence with the shapes of the teeth of the respective portions of the spherical gear, and the teeth can be continuously meshed with the entire circumference of the spherical gear.

[3] Preferably, there is provided the joint device, wherein the first drive mechanism and the second drive mechanism comprise respectively a gear rotation motor for performing a gear rotation of the first saddle gear or the second saddle gear, a shaft rotation motor for performing a rotary drive around the first shaft or performing a rotary drive around the second shaft, and a differential mechanism provided between the first saddle gear or the second saddle gear and the gear rotation motor and the shaft rotation motor.

According to this configuration, since the differential mechanism is provided between the saddle gear and the gear rotation motor and the shaft rotation motor, it is possible to constrain or drive all of three degrees of freedom of rotation of the spherical gear while fixing all of the gear rotation motor and the shaft rotation motor to the first member.

[4] Preferably, there is provided the joint device, wherein the rotation axis of the gear rotation motor and the rotation axis of the shaft rotation motor of the first drive mechanism are disposed in a direction orthogonal to the first axis, and the rotation axis of the gear rotation motor and the rotation axis of the shaft rotation motor of the second drive mechanism are disposed in a direction orthogonal to the second axis.

According to this configuration, since the disposition direction of the first drive mechanism is orthogonal to the first axis direction, and the disposition direction of the second drive mechanism is orthogonal to the second axis direction, it is possible to reduce the outward protrusion of the device to miniaturize the entire joint device.

[5] Preferably, there is provided the joint device in which the number of teeth of the spherical gear in mesh with the first saddle gear or the second saddle gear is 1 or 2 times the number of teeth of the first saddle gear and the second saddle gear.

According to this configuration, it is possible to make the drive poles of the first saddle gear and the second saddle gear coincide with the driven pole of the spherical gear.

[6] Preferably, the joint device provides a joint device applied to a general-purpose robot.

According to this configuration, by applying the joint device to the general-purpose robot, it is possible to set three degrees of freedom in one joint of the general-purpose robot, reduce the number of joints, and transmit a large torque.

[7] The present invention also provides a gear set composed of a spherical gear and a first saddle gear, wherein the spherical gear has a tooth structure in which a contour of a spur gear formed in a virtual plane comprising a first ground axis passing through a center of the sphere is cut around the first ground axis, on the entire surface of the sphere, and the first saddle gear meshes with the spherical gear, and
the first saddle gear is capable of constantly constraining two of three degrees of freedom of rotation of the spherical gear except for the rotational freedom around the first ground axis by three interactions of a gear rotation transmitting a force by which the meshing portion moves in a longitude direction with respect to the first ground axis of the spherical gear, a shaft rotation transmitting a force around the first axis passing through a center of the spherical gear and a center of the first saddle gear, and a lateral slide not transmitting a force of the meshing portion sliding in a latitude direction; and comprises a conical, conical trapezoidal, or annular drive pole tooth and a curved tooth having a predetermined tooth width and a tooth surface with a curved shape.

According to such a configuration, the first saddle gear can continuously transmit power at an unlimited rotation angle as in a normal spur gear pair without breaking the mesh even at the driven pole of the spherical gear.

[8] The present invention also provides a gear set composed of a spherical gear, a first saddle gear, and a second saddle gear, wherein the spherical gear has a tooth structure in which a contour of a spur gear formed in a virtual plane comprising a first ground axis and a second ground axis passing through a center of the sphere is cut around the first ground axis and around the second ground axis, respectively, on the entire surface of the sphere, the first saddle gear meshes with the spherical gear, and the first saddle gear is capable of constantly constraining two degrees of freedom of rotation other than the degree of freedom of rotation around the first ground axis among three degrees of freedom of rotation of the spherical gear by three interactions of a gear rotation transmitting a force by which the meshing portion moves in a longitude direction with respect to the first ground axis of the spherical gear, a shaft rotation transmitting a force around the first axis passing through a center of the spherical gear and a center of the first saddle gear, and a lateral slide not transmitting a force of the meshing portion sliding in a latitude direction, and comprises a conical, conical trapezoidal, or annular drive pole tooth, and a curved tooth having a predetermined tooth width and a tooth surface with a curved shape, and the second saddle gear meshes with the spherical gear, and the second saddle gear is capable of constantly constraining two degrees of freedom of rotation other than the degree of freedom of rotation around the second ground axis among three degrees of freedom of rotation of the spherical gear by three interactions of a gear rotation transmitting a force by which the meshing portion moves in a longitude direction with respect to the second ground axis of the spherical gear, a shaft rotation transmitting a force around the second axis passing through a center of the spherical gear and a center of the second saddle gear, and a lateral slide not transmitting a force of the meshing portion sliding in a latitude direction, and comprises a conical, conical trapezoidal, or annular drive pole tooth, and a curved tooth having a predetermined tooth width and a tooth surface with a curved shape.

According to such a configuration, the first saddle gear and the second saddle gear can continuously transmit power at an unlimited rotation angle as in a normal spur gear pair without breaking the mesh even at the driven pole of the spherical gear.

In addition, as an effect of the present invention, the following can be said. A gear set having three degrees of freedom of rotation capable of transmitting a large torque and a joint device using the same can be provided.

Embodiments of the present invention are described below, based on the accompanying drawings. It is to be noted that the drawings also include drawings conceptually (schematically) showing the schematic configuration of the joint device. In the present specification, the straight line passing through the center of the spherical body is referred to as (first or second) "ground axis", and the straight line passing through the center of the spherical gear and the center of the (first or second) saddle gear is referred to as (first or second) "axis". Of the first and second ground axes, two ground axes orthogonal to each other as one embodiment are sometimes referred to as an "r axis" and an "e axis". In addition, of the first and second axes, two axes orthogonal to each other as one embodiment are sometimes referred to as an "X axis" and a "Y axis".

Next, a description will be given of the joint device 10, the first drive unit 40, and the second drive unit 60 according to another embodiment. Since the basic configuration is the same as that of FIG. 1 and FIG. 2, the same components are denoted by the same reference numerals, and a description thereof is omitted.

Figure 12:
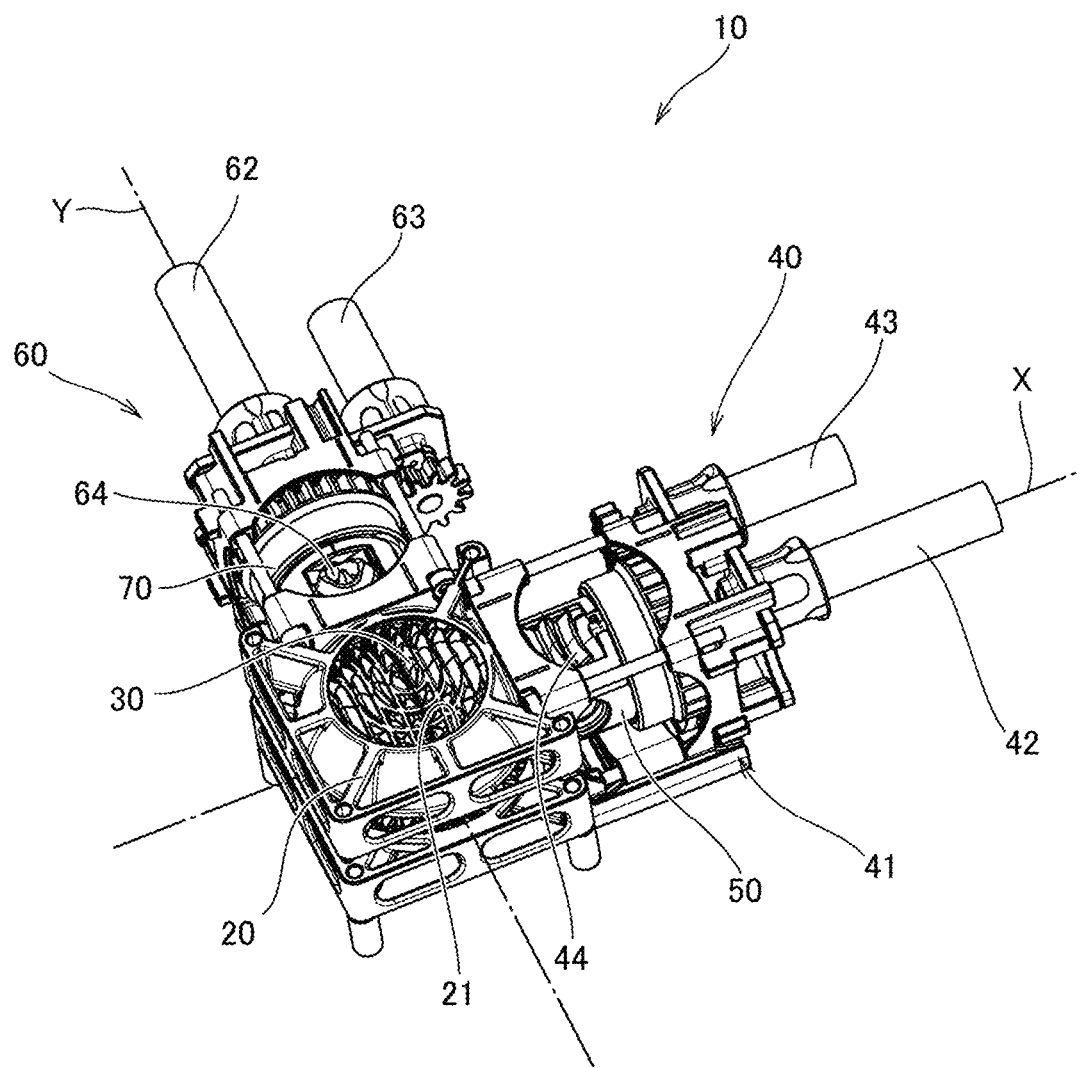
FIG. 12 is a perspective drawing showing a joint device according to another embodiment of the present invention.
Figure 13:
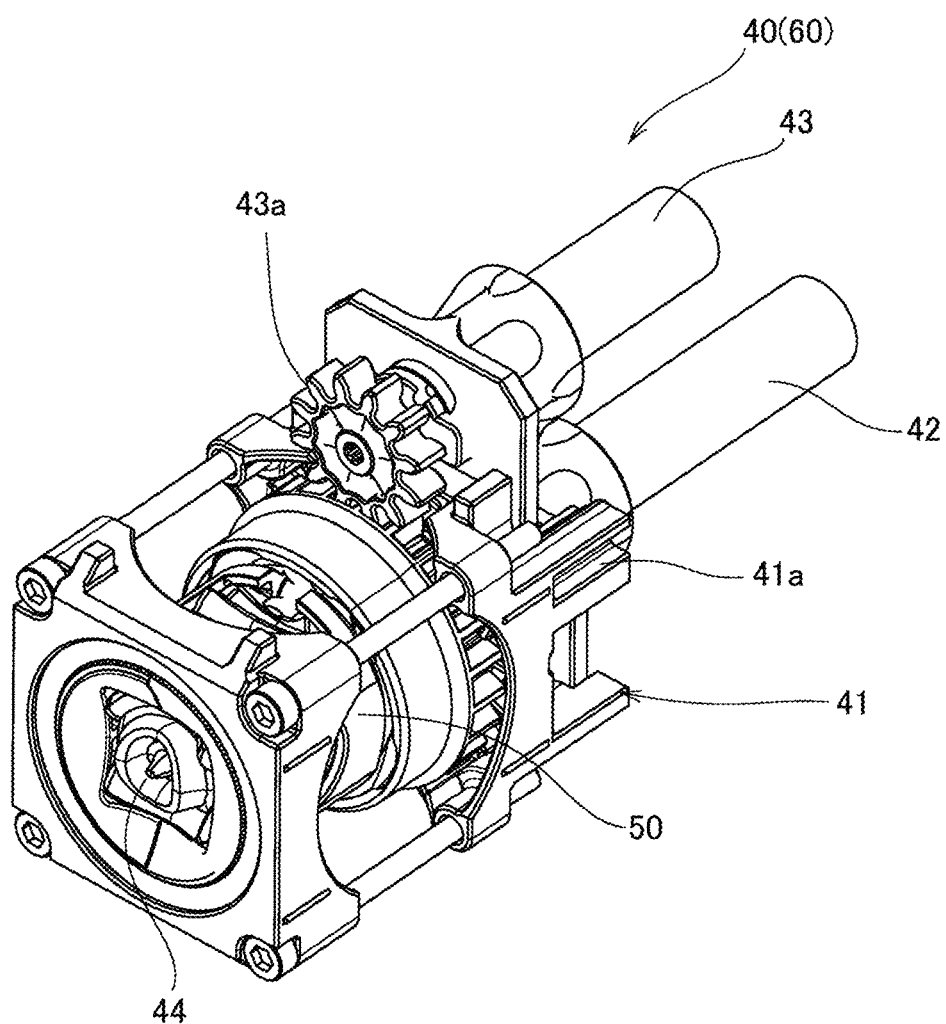
FIG. 13 is a perspective drawing showing the drive unit of FIG. 12.

As shown in FIGS. 12 and 13, in the first drive unit 40, the disposition direction of the first drive mechanism 41 is along the X-axis direction. In the second drive unit 60, the disposition direction of the second drive mechanism 61 is along the Y-axis direction. The holder 20 is largely open only on the front side. Thus, by disposing the first drive mechanism 41 and the second drive mechanism 61 along the X-axis and the Y-axis, respectively, or by changing the position or the size of the opening of the holder 20, the degree of freedom of design can be expanded to suit the robot's application.

Next, a basic configuration of the spherical gear 30 according to the present invention will be described.

As shown in FIG. 14A, an arbitrary first ground axis (r-axis) is located through the center of the spherical body 31. On the entire surface 32 of the sphere 31, a spur gear contour 33 is formed in a virtual plane containing the r-axis.

As shown in FIG. 14B, teeth 34 is formed by cutting the contour 33 of the spur gear around the r-axis. Then, a temporary spherical gear 30a having a tooth structure as shown in FIG. 14C is obtained. The spherical gear 30a is a driven gear, and a driven pole 34a is formed on the r-axis. When looking at the spherical gear 30a as a globe, the tooth shape in the vicinity of the equator 35 is well-defined, and the tooth shape is distorted as it approaches the driven pole 34a. Therefore, the general spur gear 36 cannot mesh with the temporary spherical gear 30a over the entire circumference.

Next, the first saddle gear 44 and the second saddle gear 64 will be described. Hereinafter, only the first saddle gear 44 will be described for convenience, and since the configuration of the second saddle gear 64 is the same regarding the e-axis of the spherical gear 30, a description thereof will be omitted.

Figure 15A:
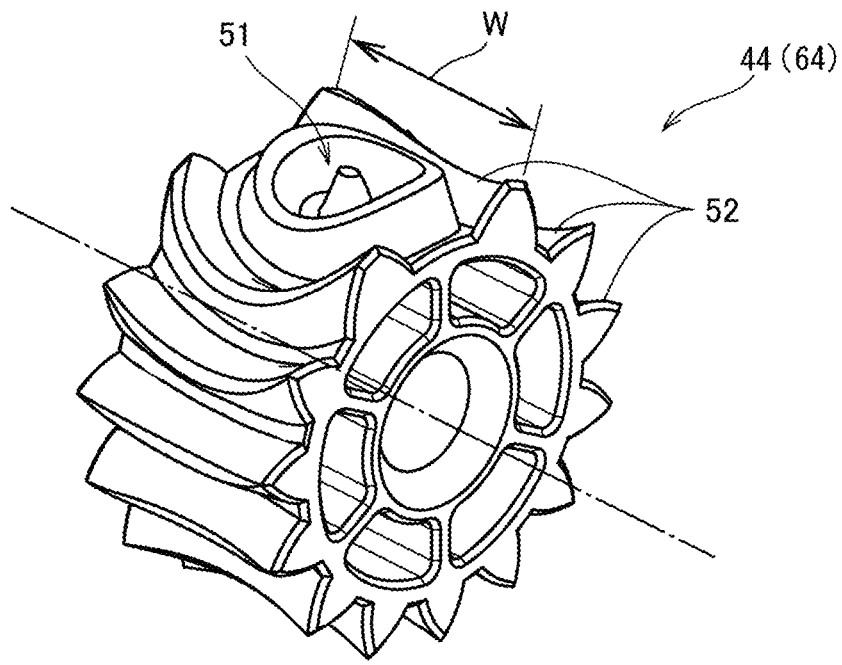
FIG. 15A and FIG. 15B are perspective drawings showing a saddle gear according to the present invention.
Figure 15B:
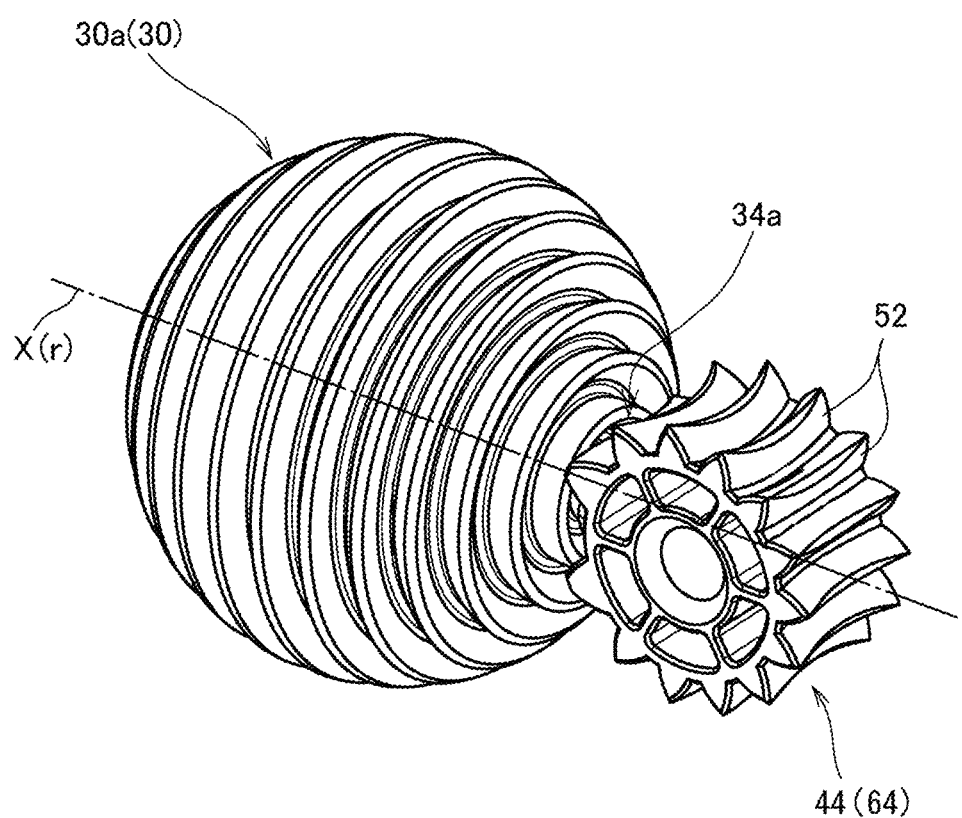

As shown in FIG. 15A and FIG. 15B, the first saddle gear 44 is capable of constantly constraining two degrees of freedom of rotation other than the degree of freedom of rotation around the r-axis among three degrees of freedom of rotation of the spherical gear by the three interactions of the gear rotation transmitting the force by which the meshing portion moves in the longitude direction with respect to the r-axis of the spherical gear 30a (30), the shaft rotation transmitting the force of the meshing portion around the X-axis direction, and the lateral slide not transmitting the force of the meshing portion sliding in the latitude direction, and comprises a conical, conical trapezoidal, or annular drive pole tooth 51, a curved tooth 52 having a curved shape (a curved shape such that the tooth surface is concave toward the drive pole tooth 51 along the circumferential direction of the first saddle gear 44), and a predetermined tooth width W. The curvature of the curved shape of the plurality of curved teeth 52 is the smallest at the position rotated 180 degrees from the drive pole tooth 51 (the pole opposite to the drive pole tooth 51), and is larger as the curved tooth is located closer to the drive pole tooth 51. With respect to the direction of the gear rotation and the direction of the lateral slide, when the driven pole 34a is viewed as the north pole of the Earth, the direction of the gear rotation is the longitude direction, and the direction of the lateral slide is the latitude direction.

The first saddle gear 44 has a unique gear structure that can mesh with the spherical gear 30a (30). Only one first saddle gear 44 can constrain two of the three degrees of freedom of rotation of the spherical gear 30a (30).

Next, the shape of the tooth surface of the first saddle gear 44 will be described.

As shown in FIG. 16A, a hypothetical clay spherical body 53 is considered, and the shape of the tooth surface of the first saddle gear 44 will be clarified below by explaining the process of forming a tooth on the clay spherical body 53. The clay spherical body 53 having a diameter of about half of the spherical gear 30a (30) is prepared, and as shown in FIG. 16B, the clay spherical body 53 is pressed against the spherical gear 30a, and is moved while rolling on the spherical surface along the circumference of a circle centered on the center of the spherical gear 30a. Then, as shown in FIG. 16C, the shape of the teeth 34 of the spherical gear 30a is transferred, and as shown in FIG. 16D, a tooth structure of the drive pole tooth 51 and the curved tooth 52 in the first saddle gear 44 is obtained.

Next, a basic configuration in the case of forming a tooth around the r-axis of the spherical gear 30 and the e-axis orthogonal to the r-axis will be described.

Figure 17A:
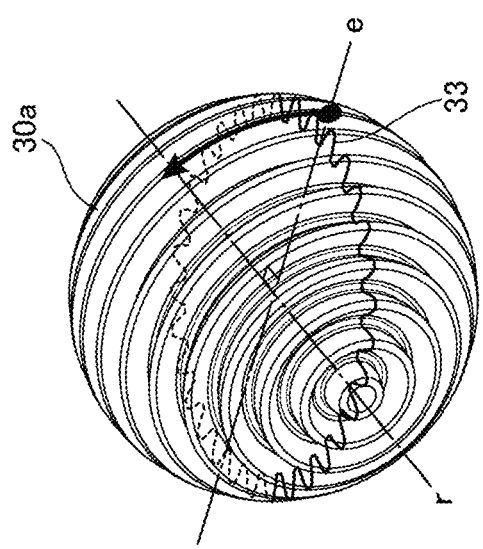
FIG. 17A to FIG. 17D are explanatory drawings showing a basic configuration of a spherical gear according to the present invention when teeth are formed around an r-axis and an e-axis orthogonal to the r-axis.
Figure 17B:
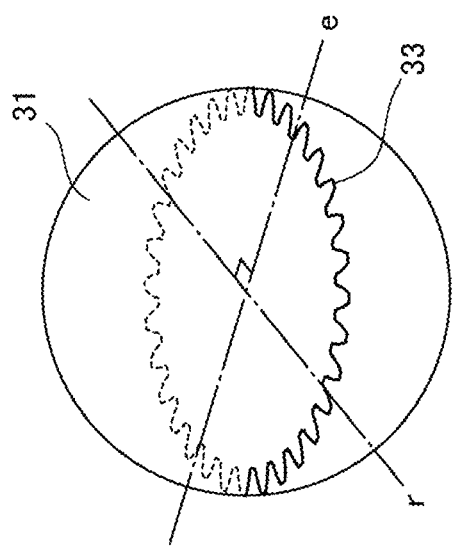
Figure 17C:
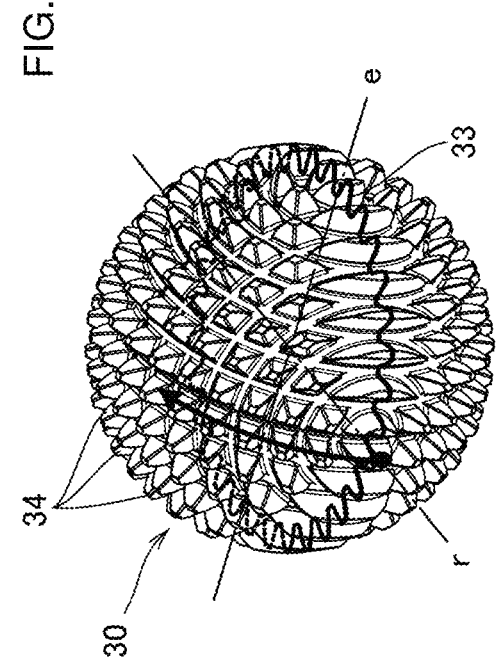

As shown in FIG. 17A, the contour 33 of the spur gear is formed on a virtual plane comprising the first ground axis (r axis) and the second ground axis (e axis) of the sphere 31, and the contour 33 of the spur gear is rotated around the r axis and cut, thereby obtaining a tooth structure as shown in FIG. 17B. Further, the contour 33 of the spur gear is rotated around the e-axis and cut. Thus, when the contour 33 of the spur gear formed on the virtual plane comprising the first ground axis and the second ground axis that intersect with a phase difference (in the present embodiment, the r-axis and the e-axis which are orthogonal to each other) is cut around the r-axis and the e-axis, respectively, the spherical gear 30 having teeth 34 cut around the r-axis and the e-axis respectively is obtained as shown in FIG. 17C.

Figure 17D:
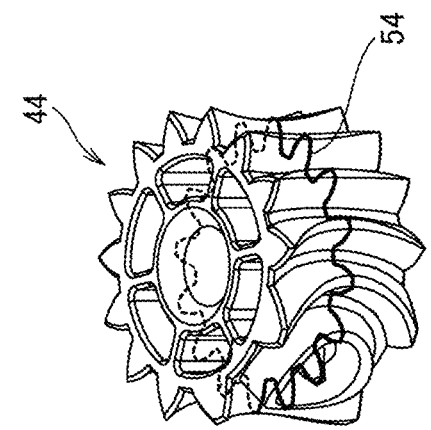

As shown in FIG. 17D, the contour 54 along the circumferential direction of the first saddle gear 44 corresponds to ½ of the circumference of the spur gear contour 33 and meshes with the teeth 34 of the spherical gear 30 described above.

Figure 18A:
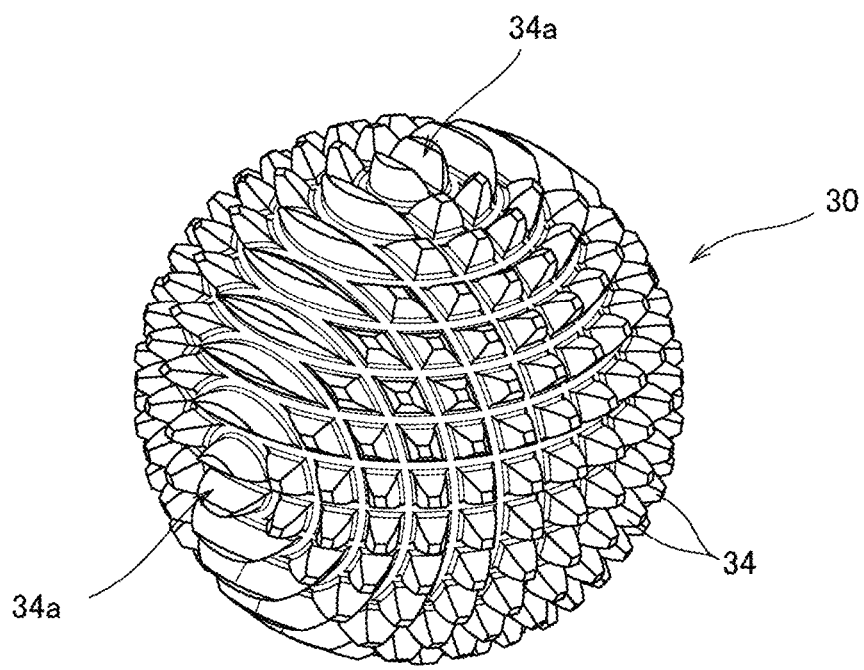
FIG. 18A and FIG. 18B are perspective drawings showing a meshing state between the spherical gear, the first saddle gear, and the second saddle gear according to the present invention.
Figure 18B:
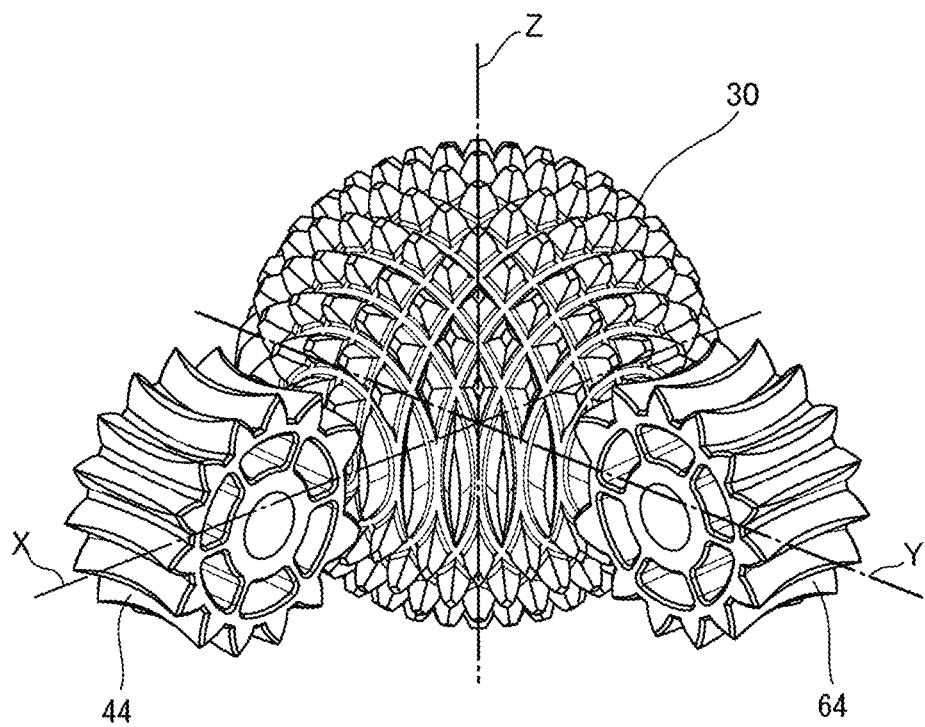

As shown in FIG. 18A, a spherical gear 30 in which teeth 34 with orthogonal 90-degree phase shift are superimposed is obtained, and as shown in FIG. 18B, the first saddle gear 44 and the second saddle gear 64 mesh with each phase having the 90-degree shift, respectively. In the present embodiment, the first ground axis and the second ground axis are the r-axis and the e-axis having phases shifted by 90 degrees, but the phase difference between the first ground axis and the second ground axis is not limited to 90 degrees, and may have any phase difference, for example, 30 degrees, 45 degrees, 60 degrees, or the like. A tooth structure in which the contour of the spur gear formed on the virtual plane comprising the first ground axis and the second ground axis having these phase differences is cut around the first ground axis and the second ground axis, respectively, can be formed. By meshing the first saddle gear 44 and the second saddle gear 64 with the spherical gear 30, all of the three degrees of freedom of rotation of the spherical gear 30 can be constrained or driven. The number of teeth of the spherical gear 30 in mesh with the first saddle gear 44 is 1 or 2 times the number of teeth of the first saddle gear 44.

Thereby, the drive pole (drive pole tooth 51) of the first saddle gear 44 can be made to coincide with the driven pole 34a of the spherical gear 30.

Next, the operation of the joint device 10 according to the basic configuration described above will be described.

As shown in FIGS. 1 and 2, the spherical gear 30 is rotated by driving the shaft rotation motor 42 and the gear rotation motor 43 of the first drive unit 40 to revolve the first saddle gear 44. By stopping the movement of the first drive unit 40, the two degrees of freedom of rotation of the spherical gear 30 are constrained by the first saddle gear 44, and when the second drive unit 60 is driven in this state, the remaining one degree of freedom of the spherical gear 30 can be driven. Further, by stopping the movement of the first drive unit 40 and the second drive unit 60, all three degrees of freedom of rotation of the spherical gear 30 can be constrained and brought into a fixed state.

Next, the operation and effects of the joint device 10 described above will be described.

In the configuration of the example of the present invention, the holder 20 of the joint device 10 is provided with a first drive unit 40 and a second drive unit 60 that drive the spherical gear 30. Since the first drive unit 40 and the second drive unit 60 are fixed to the holder 20, it is advantageous to increase the output of the power source. In addition, since each of the first drive unit 40 and the second drive unit 60 transmits the driving force to the spherical gear 30, a so-called parallel mechanism capable of combining the forces can be obtained. In the prior art, there has been a technique in which teeth are provided on a portion of a sphere, but this limits the range of motion to a narrow range in which the teeth are provided. In this respect, since the present invention has two tooth structures in which the contour 33 of the spur gear formed in the virtual plane comprising the first ground axis and the second ground axis passing through the center of the sphere 31 is cut around the first ground axis and the second ground axis, respectively, on the entire surface 32 of the sphere 31, the movable range can be enlarged without limitation.

Further, in the example of the present invention, there are provided a first saddle gear 44 and a second saddle gear 64 meshed with the spherical gear 30. The first saddle gear 44 and the second saddle gear 64 have special tooth structures not found in the prior art, corresponding to the unavoidable distortion of the tooth structure in the spherical gear 30. More specifically, the first saddle gear 44 is capable of constantly constraining two degrees of freedom of rotation other than the degree of freedom of rotation around the first ground axis among three degrees of rotation of the spherical gear 30a (30) by the three interactions of the gear rotation transmitting the force by which the meshing portion moves in the longitude direction with respect to the first ground axis of the spherical gear 30a (30), the shaft rotation transmitting the force around the first axis, and the lateral slide not transmitting the force of the meshing portion sliding in the latitude direction, and comprises a conical, conical trapezoidal, or annular drive pole tooth 51, a curved tooth 52 having a curved shape (a curved shape such that the tooth surface is concave toward the drive pole tooth 51 along the circumferential direction of the first saddle gear 44), and a predetermined tooth width W. The same applies to the second saddle gear 64. Therefore, the first saddle gear 44 and the second saddle gear 64 can continuously transmit power without limiting the rotation angle as in the normal spur gear pair without failing the mesh not only at the equator portion of the spherical gear but also at the driven pole 34a.

Further, in the example of the present invention, as a suitable freedom degree design method, by appropriately disposing two saddle gears having two degrees of freedom of rotation with respect to the two tooth structures of the spherical gear 30, driving of the spherical gear in three degrees of freedom of rotation has been realized. Specifically, the first saddle gear 44 and the second saddle gear 64 are installed with respect to one spherical gear 30, and the first saddle gear 44 and the second saddle gear 64 corresponded to two tooth structures around the first ground axis and the second ground axis of the spherical gear 30, respectively. In addition, the first saddle gear 44 and the second saddle gear 64 are each incorporated in the first drive mechanism 41 of the first drive unit 40 or the second drive mechanism 61 of the second drive unit 60 to be provided with the drive ability of two degrees of freedom of rotation, thereby driving the two degrees of freedom constrained by each among the three degrees of freedom of rotation of the spherical gear 30. Since the two tooth structures of the spherical gear 30 have a phase difference, a total of four driven degrees of freedom by the first saddle gear 44 and the second saddle gear 64 are appropriately arranged on the spherical gear 30, and it is possible to always constrain (drive) all three degrees of freedom of rotation of the spherical gear 30. Thus, in the present invention, it is possible to provide the joint device 10 having three degrees of freedom of rotation based on the meshing of the gears capable of transmitting a large torque.

Further, the shape of the teeth of the first saddle gear 44 and the second saddle gear 64 can be matched in correspondence with the shape of the teeth of the respective portions of the spherical gear 30, and can be continuously meshed around the entire circumference of the spherical gear 30.

Further, since the differential mechanisms 50 and 70 are provided between the first saddle gear 44 and the second saddle gear 64 and the shaft rotation motors 42 and 62 and the gear rotation motors 43 and 63, it is possible to constrain or drive all the three degrees of freedom of rotation of the spherical gear 30 while fixing the shaft rotation motors 42 and 62 and the gear rotation motors 43 and 63 to the first member 11.

At this time, as a control algorithm, a motor control algorithm for realizing three degrees of freedom of the spherical gear 30 is adopted. In the example of the present invention, four motors are used as input actuators, and their rotation angles can be obtained by simple inverse kinematic calculations. Further, since a large number of electromagnets are not driven as in the spherical motor of the conventional technique, it is possible to use the motor control system similar to the conventional technique.

Further, the joint device 10 is suitable for a general-purpose robot. By applying the joint device 10 to the general-purpose robot, it is possible to reduce the number of joints as three degrees of freedom in one joint of the general-purpose robot and to transmit a large torque. In the prior art, there is no technique that satisfies all of the features of having three degrees of freedom of rotation while fixing all of the motors, capable of transmitting a large output without slippage, and having a wide range of rotation angles. Therefore, one of the effects peculiar to the present invention is a reduction in size and weight of a joint portion of a large output, multi-degree of freedom, and a large work area system, such as a robot arm, and a reduction in cost and an improvement in energy efficiency at the time of operation by reducing rigidity accompanying the reduction. In addition, regarding a robot emphasizing aesthetics, such as a doll robot, or a robot like a soft robot, in which a rigid body portion is desired to be reduced as much as possible, the present invention is more effective in that a conventional three-joint serial link mechanism can be formed in one joint.

Further, when combined, the gear set composed of the spherical gear 30, the first saddle gear 44, and the second saddle gear enables continuous power transmission without limitation of the rotation angle as in the normal spur gear pair without breaking the mesh between the first saddle gear 44 and the spherical gear 30 even at the driven pole 34a.

Further, in the gear set, the first saddle gear 44 and the second saddle gear 64 are installed with respect to one spherical gear 30, and the first saddle gear 44 and the second saddle gear 64 corresponded to two tooth structures formed around the first ground axis and the second ground axis of the spherical gear 30, respectively. In addition, the first saddle gear 44 and the second saddle gear 64 are each incorporated in the first drive mechanism 41 of the first drive unit 40 or the second drive mechanism 61 of the second drive unit 60 to be provided with the drive ability of two degrees of freedom of rotation, thereby driving the two degrees of freedom constrained by each among the three degrees of freedom of rotation of the spherical gear 30. Since the two tooth structures of the spherical gear 30 have a phase difference, a total of four driven degrees of freedom by the first saddle gear 44 and the second saddle gear 64 are appropriately arranged on the spherical gear 30, and it is possible to always constrain (drive) all three degrees of freedom of rotation of the spherical gear 30. Thus, in the present invention, it is possible to obtain a gear set having three degrees of freedom of rotation, based on the meshing of the gear capable of transmitting a large torque.

The present invention is not limited to the number of teeth of the gear shown in the drawing of the example. The number of teeth of the spherical gear 30 and the number of teeth of the first saddle gear 44 and the second saddle gear 64 may be the same. In addition, in the example, the first member 11 is a supporting member, but it is not limited thereto, and the first member 11 may be a wall, a ceiling, or the like. In addition, in the example, the second member 12 is a shaft-shaped output member, but it is not limited thereto, and a camera, a sensor, or the like may be provided instead of the output member. For example, by attaching a camera instead of the second member 12 in FIGS. 1 and 2, and mounting a gear set comprising these cameras on a surveillance camera or a drone, it is possible to obtain a photographing apparatus capable of controlling a photographing angle in all directions.

That is, as far as the operations and effects of the present invention are exhibited, the present invention is not limited to the examples. The present invention is suitable for a general-purpose robot for industrial use.

INDUSTRIAL APPLICABILITY

The present invention is suitable for a differential mechanism of a general-purpose robot for industrial use.

The invention claimed is:

1. A joint device having three degrees of freedom disposed between a first member and a second member, wherein the joint device comprises:
    a holder provided on the first member and having a spherical support portion capable of supporting a sphere formed thereon,
    a spherical gear rotatably supported by the spherical support portion of the holder, the spherical gear having the second member and a tooth structure in which a contour of a spur gear formed in a virtual plane comprising a first ground axis and a second ground axis passing through a center of the sphere is cut around the first ground axis and around the second ground axis, respectively, on an entire surface of the sphere, a first drive unit provided on the holder and driving the spherical gear, and a second drive unit provided on the holder and driving the spherical gear, wherein the first drive unit comprises a first saddle gear meshing with the spherical gear, and a first drive mechanism for driving a rotation of the first saddle gear around a first axis passing through a center of the spherical gear and a center of the first saddle gear while performing a gear rotation of the first saddle gear, the first saddle gear is capable of constantly constraining two degrees of freedom of rotation other than the one around the first ground axis among three degrees of freedom of rotation of the spherical gear by three interactions of a gear rotation transmitting a force by which the meshing portion moves in a longitude direction with respect to the first ground axis of the spherical gear, a shaft rotation transmitting a force around the first axis, and a lateral slide not transmitting a force of the meshing portion sliding in a latitude direction; and comprises a conical, conical trapezoidal, or annular drive pole tooth, and a curved tooth having a predetermined tooth width and a tooth surface with a curved shape, the second drive unit comprises a second saddle gear meshing with the spherical gear, and a second drive mechanism for driving a rotation of the second saddle gear around a second axis passing through the center of the spherical gear and the center of the second saddle gear while performing a gear rotation of the second saddle gear, and the second saddle gear is capable of constantly constraining two degrees of freedom of rotation other than the one around the second ground axis among the three degrees of freedom of rotation of the spherical gear by three interactions of a gear rotation transmitting a force by which the meshing portion moves in the longitude direction with respect to the second ground axis of the spherical gear, a shaft rotation transmitting a force around the second axis, and a lateral slide not transmitting a force of the meshing portion slides in the latitude direction, and comprises a conical, conical trapezoidal, or annular drive pole tooth and a curved tooth having a predetermined tooth width and a tooth surface with a curved shape.

2. The joint device according to claim 1, wherein the tooth structure of the spherical gear meshes with the first saddle gear and the second saddle gear at an intermediate portion between two driven poles on the first ground axis, and has a shape in which a curvature increases as the tooth structure approaches the driven pole on the first ground axis, and in the first saddle gear and the second saddle gear, a curvature of the tooth surface of the curved tooth decreases as the first saddle gear and the second saddle gear move away from the drive pole tooth in the circumferential direction.

3. The joint device according to claim 1, wherein the first drive mechanism and the second drive mechanism comprise respectively a gear rotation motor for performing a gear rotation of the first saddle gear or the second saddle gear, a shaft rotation motor for performing a rotary drive around the first shaft or performing a rotary drive around the second shaft, and a differential mechanism provided between the first saddle gear or the second saddle gear and the gear rotation motor and the shaft rotation motor.

4. The joint device according to claim 1, wherein the rotation axis of the gear rotation motor and the rotation axis of the shaft rotation motor of the first drive mechanism are disposed in a direction orthogonal to the first axis, and the rotation axis of the gear rotation motor and the rotation axis of the shaft rotation motor of the second drive mechanism are disposed in a direction orthogonal to the second axis.

5. The joint device according to claim 1, wherein a number of teeth of the spherical gear in mesh with the first saddle gear or the second saddle gear is 1 or 2 times a number of teeth of the first saddle gear and the second saddle gear.

6. The joint device according to claim 1, wherein the joint device is applied to a general-purpose robot.

7. A gear set composed of a spherical gear, a first saddle gear, and a second saddle gear, wherein the spherical gear has a tooth structure in which a contour of a spur gear formed in a virtual plane comprising a first ground axis and a second ground axis passing through a center of the sphere is cut around the first ground axis and around the second ground axis, respectively, on an entire surface of the sphere, the first saddle gear meshes with the spherical gear, and the first saddle gear is capable of constantly constraining two degrees of freedom of rotation other than the degree of freedom of rotation around the first ground axis among three degrees of freedom of rotation of the spherical gear by three interactions of a gear rotation transmitting a force by which the meshing portion moves in a longitude direction with respect to the first ground axis of the spherical gear, a shaft rotation transmitting a force around a first axis passing through a center of the spherical gear and a center of the first saddle gear, and a lateral slide not transmitting a force of the meshing portion sliding in a latitude direction, and comprises a conical, conical trapezoidal, or annular drive pole tooth, and a curved tooth having a predetermined tooth width and a tooth surface with a curved shape, and the second saddle gear meshes with the spherical gear, and the second saddle gear is capable of constantly constraining two degrees of freedom of rotation other than the degree of freedom of rotation around the second ground axis among the three degrees of freedom of rotation of the spherical gear by three interactions of a gear rotation transmitting a force by which the meshing portion moves in a longitude direction with respect to the second ground axis of the spherical gear, a shaft rotation transmitting a force around a second axis passing through the center of the spherical gear and a center of the second saddle gear, and a lateral slide not transmitting a force of the meshing portion sliding in a latitude direction, and comprises a conical, conical trapezoidal, or annular drive pole tooth, and a curved tooth having a predetermined tooth width and a tooth surface with a curved shape.

8. A gear set composed of a spherical gear and a first saddle gear, wherein the spherical gear has a tooth structure in which a contour of a spur gear formed in a virtual plane comprising a first ground axis and a second ground axis passing through a center of the sphere is cut around the first ground axis and around the second ground axis, respectively, on the entire surface of the sphere, and the first saddle gear meshes with the spherical gear, and the first saddle gear is capable of constantly constraining two of three degrees of freedom of rotation of the spherical gear except for the rotational freedom around the first ground axis by three interactions of a gear rotation transmitting a force by which the meshing portion moves in a longitude direction with respect to the first ground axis of the spherical gear, a shaft rotation transmitting a force around the first axis passing through a center of the spherical gear and a center of the first saddle gear, and a lateral slide not transmitting a force of the meshing portion sliding in a latitude direction; and comprises a conical, conical trapezoidal, or annular drive pole tooth and a curved tooth having a predetermined tooth width and a tooth surface with a curved shape.

\* \* \* \* \*